United States Patent
Ahn et al.

(10) Patent No.: US 10,193,917 B2
(45) Date of Patent: Jan. 29, 2019

(54) RULE-BASED NETWORK-THREAT DETECTION

(71) Applicant: Centripetal Networks, Inc., Portsmouth, NH (US)

(72) Inventors: David K. Ahn, Winston-Salem, NC (US); Keith A. George, Fort Royal, VA (US); Peter P. Geremia, Portsmouth, NH (US); Pierre Mallett, III, Herndon, VA (US); Sean Moore, Hollis, NH (US); Robert T. Perry, Ashburn, VA (US); Jonathan R. Rogers, Hampton Falls, NH (US)

(73) Assignee: Centripetal Networks, Inc., Portsmouth, NH (US)

( * ) Notice: Subject to any disclaimer, the term of this patent is extended or adjusted under 35 U.S.C. 154(b) by 0 days.

(21) Appl. No.: 15/827,477

(22) Filed: Nov. 30, 2017

(65) Prior Publication Data
US 2018/0159883 A1    Jun. 7, 2018

Related U.S. Application Data

(63) Continuation of application No. 14/690,302, filed on Apr. 17, 2015, now Pat. No. 9,866,576.

(51) Int. Cl.
*H04L 29/06*    (2006.01)
*H04L 12/06*    (2006.01)
*H04L 12/26*    (2006.01)

(52) U.S. Cl.
CPC ...... *H04L 63/1425* (2013.01); *H04L 63/0227* (2013.01); *H04L 63/0236* (2013.01);
(Continued)

(58) Field of Classification Search
CPC ............. H04L 63/1425; H04L 63/1441; H04L 63/0227; H04L 63/1416; H04L 63/0263; H04L 63/12; H04L 63/0236; H04L 43/028
See application file for complete search history.

(56) References Cited

U.S. PATENT DOCUMENTS 6,098,172 A    8/2000    Coss et al.
6,147,976 A    11/2000   Shand et al.
(Continued)

FOREIGN PATENT DOCUMENTS

AU    2005328336 B2    9/2011
AU    2006230171 B2    6/2012
(Continued)

OTHER PUBLICATIONS

May 6, 2016—(U.S.) Office Action—U.S. Appl. No. 14/714,207.
(Continued)

*Primary Examiner* — Darren B Schwartz
(74) *Attorney, Agent, or Firm* — Banner & Witcoff, Ltd.

(57) ABSTRACT

A packet-filtering device may receive packet-filtering rules configured to cause the packet-filtering device to identify packets corresponding to network-threat indicators. The packet-filtering device may receive packets and, for each packet, may determine that the packet corresponds to criteria specified by a packet-filtering rule. The criteria may correspond to one or more of the network-threat indicators. The packet-filtering device may apply an operator specified by the packet-filtering rule. The operator may be configured to cause the packet-filtering device to either prevent the packet from continuing toward its destination or allow the packet to continue toward its destination. The packet-filtering device may generate a log entry comprising information from the packet-filtering rule that identifies the one or more network-threat indicators and indicating whether the packet-filtering
(Continued)

device prevented the packet from continuing toward its destination or allowed the packet to continue toward its destination.

20 Claims, 27 Drawing Sheets

(52) U.S. Cl.
CPC .......... *H04L 63/0263* (2013.01); *H04L 63/12* (2013.01); *H04L 63/1416* (2013.01); *H04L 63/1441* (2013.01); *H04L 43/028* (2013.01)

(56) References Cited

U.S. PATENT DOCUMENTS

| | | | |
|---|---|---|---|
| 6,226,372 B1 | 5/2001 | Beebe et al. | |
| 6,279,113 B1 | 8/2001 | Vaidya | |
| 6,317,837 B1 | 11/2001 | Kenworthy | |
| 6,484,261 B1 | 11/2002 | Wiegel | |
| 6,611,875 B1 | 8/2003 | Chopra et al. | |
| 6,662,235 B1 | 12/2003 | Callis et al. | |
| 6,826,694 B1 | 11/2004 | Dutta et al. | |
| 7,089,581 B1 | 8/2006 | Nagai et al. | |
| 7,107,613 B1 | 9/2006 | Chen et al. | |
| 7,143,438 B1 | 11/2006 | Coss et al. | |
| 7,215,637 B1 | 5/2007 | Ferguson et al. | |
| 7,227,842 B1 | 6/2007 | Ji et al. | |
| 7,237,267 B2 | 6/2007 | Rayes et al. | |
| 7,263,099 B1 | 8/2007 | Woo et al. | |
| 7,296,288 B1 | 11/2007 | Hill et al. | |
| 7,299,353 B2 | 11/2007 | Le Pennec et al. | |
| 7,331,061 B1 | 2/2008 | Ramsey et al. | |
| 7,478,429 B2 | 1/2009 | Lyon | |
| 7,539,186 B2 | 5/2009 | Aerrabotu et al. | |
| 7,610,621 B2 | 10/2009 | Turley et al. | |
| 7,684,400 B2 | 3/2010 | Govindarajan et al. | |
| 7,710,885 B2 | 5/2010 | Ilnicki et al. | |
| 7,721,084 B2 | 5/2010 | Salminen et al. | |
| 7,818,794 B2 | 10/2010 | Wittman | |
| 7,913,303 B1 | 3/2011 | Rouland et al. | |
| 7,954,143 B2 | 5/2011 | Aaron | |
| 8,004,994 B1 | 8/2011 | Darisi et al. | |
| 8,009,566 B2 | 8/2011 | Zuk et al. | |
| 8,037,517 B2 | 10/2011 | Fulp et al. | |
| 8,042,167 B2 | 10/2011 | Fulp et al. | |
| 8,117,655 B2 | 2/2012 | Spielman | |
| 8,176,561 B1 | 5/2012 | Hurst et al. | |
| 8,306,994 B2 | 11/2012 | Kenworthy | |
| 8,331,234 B1* | 12/2012 | Newton | H04L 43/026 370/231 |
| 8,495,725 B2 | 7/2013 | Ahn | |
| 8,726,379 B1 | 5/2014 | Stiansen et al. | |
| 8,806,638 B1 | 8/2014 | Mani | |
| 8,832,832 B1 | 9/2014 | Visbal | |
| 8,856,926 B2 | 10/2014 | Narayanaswamy et al. | |
| 8,935,785 B2 | 1/2015 | Pandrangi | |
| 9,094,445 B2 | 7/2015 | Moore et al. | |
| 9,124,552 B2 | 9/2015 | Moore | |
| 9,137,205 B2 | 9/2015 | Rogers et al. | |
| 9,154,446 B2 | 10/2015 | Gemelli et al. | |
| 9,160,713 B2 | 10/2015 | Moore | |
| 9,531,672 B1* | 12/2016 | Li | H04L 63/02 |
| 2001/0039579 A1* | 11/2001 | Trcka | G06F 21/552 709/224 |
| 2001/0039624 A1 | 11/2001 | Kellum | |
| 2002/0016858 A1 | 2/2002 | Sawada et al. | |
| 2002/0038339 A1 | 3/2002 | Xu | |
| 2002/0049899 A1 | 4/2002 | Kenworthy | |
| 2002/0112188 A1 | 8/2002 | Syvanne | |
| 2002/0164962 A1 | 11/2002 | Mankins et al. | |
| 2002/0165949 A1 | 11/2002 | Na et al. | |
| 2002/0186683 A1 | 12/2002 | Buck et al. | |
| 2002/0198981 A1 | 12/2002 | Corl et al. | |
| 2003/0018591 A1 | 1/2003 | Komisky | |
| 2003/0035370 A1 | 2/2003 | Brustoloni | |
| 2003/0051026 A1 | 3/2003 | Carter et al. | |
| 2003/0097590 A1 | 5/2003 | Syvanne | |
| 2003/0105976 A1 | 6/2003 | Copeland | |
| 2003/0120622 A1 | 6/2003 | Nurmela et al. | |
| 2003/0123456 A1 | 7/2003 | Denz et al. | |
| 2003/0142681 A1 | 7/2003 | Chen et al. | |
| 2003/0145225 A1 | 7/2003 | Bruton et al. | |
| 2003/0154297 A1 | 8/2003 | Suzuki et al. | |
| 2003/0154399 A1 | 8/2003 | Zuk et al. | |
| 2003/0188192 A1 | 10/2003 | Tang et al. | |
| 2003/0212900 A1 | 11/2003 | Liu et al. | |
| 2003/0220940 A1 | 11/2003 | Futoransky et al. | |
| 2004/0010712 A1 | 1/2004 | Hui et al. | |
| 2004/0073655 A1 | 4/2004 | Kan et al. | |
| 2004/0088542 A1 | 5/2004 | Daude et al. | |
| 2004/0093513 A1 | 5/2004 | Cantrell et al. | |
| 2004/0098511 A1 | 5/2004 | Lin et al. | |
| 2004/0131056 A1* | 7/2004 | Dark | H04L 43/00 370/386 |
| 2004/0151155 A1 | 8/2004 | Jouppi | |
| 2004/0172529 A1 | 9/2004 | Culbert | |
| 2004/0172557 A1 | 9/2004 | Nakae et al. | |
| 2004/0177139 A1 | 9/2004 | Schuba et al. | |
| 2004/0193943 A1 | 9/2004 | Angelino et al. | |
| 2004/0199629 A1 | 10/2004 | Bomer et al. | |
| 2004/0205360 A1 | 10/2004 | Norton et al. | |
| 2004/0250124 A1 | 12/2004 | Chesla et al. | |
| 2005/0010765 A1 | 1/2005 | Swander et al. | |
| 2005/0024189 A1 | 2/2005 | Weber | |
| 2005/0071650 A1 | 3/2005 | Jo et al. | |
| 2005/0108557 A1 | 5/2005 | Kayo et al. | |
| 2005/0114704 A1 | 5/2005 | Swander | |
| 2005/0117576 A1 | 6/2005 | McDysan et al. | |
| 2005/0125697 A1 | 6/2005 | Tahara | |
| 2005/0138204 A1 | 6/2005 | Iyer et al. | |
| 2005/0138353 A1 | 6/2005 | Spies et al. | |
| 2005/0141537 A1 | 6/2005 | Kumar et al. | |
| 2005/0183140 A1 | 8/2005 | Goddard | |
| 2005/0229246 A1 | 10/2005 | Rajagopal et al. | |
| 2005/0249214 A1* | 11/2005 | Peng | H04L 63/1458 709/224 |
| 2005/0251570 A1 | 11/2005 | Heasman et al. | |
| 2005/0286522 A1 | 12/2005 | Paddon et al. | |
| 2006/0031928 A1* | 2/2006 | Conley | H04L 63/0236 726/11 |
| 2006/0048142 A1 | 3/2006 | Roese et al. | |
| 2006/0053491 A1 | 3/2006 | Khuti et al. | |
| 2006/0070122 A1 | 3/2006 | Bellovin | |
| 2006/0080733 A1 | 4/2006 | Khosmood et al. | |
| 2006/0085849 A1 | 4/2006 | Culbert | |
| 2006/0104202 A1 | 5/2006 | Reiner | |
| 2006/0114899 A1 | 6/2006 | Toumura et al. | |
| 2006/0133377 A1 | 6/2006 | Jain | |
| 2006/0136987 A1 | 6/2006 | Okuda | |
| 2006/0137009 A1 | 6/2006 | Chesla | |
| 2006/0146879 A1 | 7/2006 | Anthias et al. | |
| 2006/0195896 A1 | 8/2006 | Fulp et al. | |
| 2006/0212572 A1 | 9/2006 | Afek et al. | |
| 2006/0248580 A1 | 11/2006 | Fulp et al. | |
| 2006/0262798 A1 | 11/2006 | Joshi et al. | |
| 2007/0083924 A1 | 4/2007 | Lu | |
| 2007/0211644 A1 | 9/2007 | Ottamalika et al. | |
| 2007/0240208 A1 | 10/2007 | Yu et al. | |
| 2008/0005795 A1 | 1/2008 | Acharya et al. | |
| 2008/0028467 A1* | 1/2008 | Kommareddy | H04L 63/1458 726/23 |
| 2008/0043739 A1 | 2/2008 | Suh et al. | |
| 2008/0072307 A1 | 3/2008 | Maes | |
| 2008/0077705 A1 | 3/2008 | Li et al. | |
| 2008/0080493 A1* | 4/2008 | Weintraub | H04L 63/0263 370/389 |
| 2008/0101234 A1* | 5/2008 | Nakil | H04L 63/1425 370/235 |
| 2008/0163333 A1 | 7/2008 | Kasralikar | |
| 2008/0229415 A1 | 9/2008 | Kapoor et al. | |
| 2008/0235755 A1 | 9/2008 | Blaisdell et al. | |
| 2008/0279196 A1 | 11/2008 | Friskney et al. | |
| 2008/0301765 A1 | 12/2008 | Nicol et al. | |

(56) References Cited

U.S. PATENT DOCUMENTS

| | | |
|---|---|---|
| 2009/0028160 A1 | 1/2009 | Eswaran et al. |
| 2009/0138938 A1 | 5/2009 | Harrison et al. |
| 2009/0172800 A1 | 7/2009 | Wool |
| 2009/0222877 A1 | 9/2009 | Diehl et al. |
| 2009/0240698 A1 | 9/2009 | Shukla et al. |
| 2009/0328219 A1 | 12/2009 | Narayanaswamy |
| 2010/0011433 A1 | 1/2010 | Harrison et al. |
| 2010/0011434 A1 | 1/2010 | Kay |
| 2010/0082811 A1 | 4/2010 | Van Der Merwe et al. |
| 2010/0095367 A1 | 4/2010 | Narayanaswamy |
| 2010/0107240 A1 | 4/2010 | Thaler et al. |
| 2010/0132027 A1 | 5/2010 | Ou |
| 2010/0199346 A1 | 8/2010 | Ling et al. |
| 2010/0211678 A1 | 8/2010 | McDysan et al. |
| 2010/0232445 A1 | 9/2010 | Bellovin |
| 2010/0242098 A1 | 9/2010 | Kenworthy |
| 2010/0268799 A1 | 10/2010 | Maestas |
| 2010/0296441 A1 | 11/2010 | Barkan |
| 2010/0303240 A1 | 12/2010 | Beachem et al. |
| 2011/0055916 A1 | 3/2011 | Ahn |
| 2011/0055923 A1 | 3/2011 | Thomas |
| 2011/0088092 A1 | 4/2011 | Nguyen et al. |
| 2011/0141900 A1 | 6/2011 | Jayawardena et al. |
| 2011/0185055 A1 | 7/2011 | Nappier et al. |
| 2011/0270956 A1 | 11/2011 | McDysan et al. |
| 2011/0277034 A1 | 11/2011 | Hanson |
| 2012/0023576 A1 | 1/2012 | Sorensen et al. |
| 2012/0106354 A1 | 5/2012 | Pleshek et al. |
| 2012/0113987 A1 | 5/2012 | Riddoch et al. |
| 2012/0240135 A1 | 9/2012 | Risbood et al. |
| 2012/0264443 A1 | 10/2012 | Ng et al. |
| 2012/0314617 A1 | 12/2012 | Erichsen et al. |
| 2012/0331543 A1 | 12/2012 | Bostrom et al. |
| 2013/0047020 A1 | 2/2013 | Hershko et al. |
| 2013/0059527 A1 | 3/2013 | Hasesaka et al. |
| 2013/0061294 A1 | 3/2013 | Kenworthy |
| 2013/0104236 A1 | 4/2013 | Ray et al. |
| 2013/0117852 A1 | 5/2013 | Stute |
| 2013/0254766 A1 | 9/2013 | Zuo et al. |
| 2013/0305311 A1 | 11/2013 | Puttaswamy Naga et al. |
| 2014/0075510 A1 | 3/2014 | Sonoda et al. |
| 2014/0115654 A1 | 4/2014 | Rogers et al. |
| 2014/0150051 A1 | 5/2014 | Bharali et al. |
| 2014/0201123 A1 | 7/2014 | Ahn et al. |
| 2014/0215561 A1* | 7/2014 | Roberson ............... H04L 63/08 726/3 |
| 2014/0215574 A1 | 7/2014 | Erb et al. |
| 2014/0259170 A1 | 9/2014 | Amsler |
| 2014/0281030 A1 | 9/2014 | Cui et al. |
| 2014/0283004 A1 | 9/2014 | Moore |
| 2014/0283030 A1 | 9/2014 | Moore |
| 2014/0317397 A1 | 10/2014 | Martini |
| 2014/0366132 A1 | 12/2014 | Stiansen et al. |
| 2015/0033336 A1 | 1/2015 | Wang et al. |
| 2015/0106930 A1 | 4/2015 | Honda et al. |
| 2015/0128274 A1* | 5/2015 | Giokas ............... H04L 63/1416 726/23 |
| 2015/0135325 A1* | 5/2015 | Stevens ............... H04L 63/1416 726/25 |
| 2015/0207809 A1* | 7/2015 | MacAulay ............ G06F 21/552 726/22 |
| 2015/0237012 A1 | 8/2015 | Moore |
| 2015/0244734 A1 | 8/2015 | Olson et al. |
| 2015/0256431 A1* | 9/2015 | Buchanan ............... H04L 67/22 709/224 |
| 2015/0304354 A1 | 10/2015 | Rogers et al. |
| 2015/0334125 A1 | 11/2015 | Bartos et al. |
| 2015/0341389 A1 | 11/2015 | Kurakami |
| 2015/0350229 A1 | 12/2015 | Mitchell |
| 2015/0372977 A1* | 12/2015 | Yin ..................... H04L 63/0236 726/1 |
| 2015/0373043 A1 | 12/2015 | Wang et al. |
| 2016/0119365 A1 | 4/2016 | Barel |
| 2016/0205069 A1 | 7/2016 | Blocher et al. |
| 2016/0294870 A1* | 10/2016 | Banerjee ............... H04L 43/067 |

FOREIGN PATENT DOCUMENTS

| | | |
|---|---|---|
| CA | 2600236 A1 | 10/2006 |
| EP | 1006701 A2 | 6/2000 |
| EP | 1313290 A1 | 5/2003 |
| EP | 1484884 A2 | 12/2004 |
| EP | 1677484 A2 | 7/2006 |
| EP | 2385676 A1 | 11/2011 |
| EP | 2498442 A1 | 9/2012 |
| EP | 1864226 B1 | 5/2013 |
| KR | 20010079361 A | 8/2001 |
| WO | 2005046145 A1 | 5/2005 |
| WO | 2006093557 A2 | 9/2006 |
| WO | 2006105093 A2 | 10/2006 |
| WO | 2007109541 A2 | 9/2007 |
| WO | 2011038420 A2 | 3/2011 |
| WO | 2012146265 A1 | 11/2012 |

OTHER PUBLICATIONS

May 13, 2016—(U.S.) Office Action—U.S. Appl. No. 13/940,240.
Jun. 14, 2016—(U.S.) Office Action—U.S. Appl. No. 14/625,486.
Feb. 25, 2016—(AU) Office Action—App 2014249055.
Feb. 24, 2016—(AU) Office Action—App 2014228257.
Jun. 9, 2016—(WO) International Search Report—PCT/US2016/026339.
Jun. 16, 2016—(CA) Office Action—App 2,888,935.
Jul. 11, 2016—(EP) Office Action—App 14720824.3.
Jul. 22, 2016—(U.S.) Office Action—U.S. Appl. No. 14/921,718.
Jul. 20, 2016—(AU) Office Action—App 2013335255.
Oct. 5, 2016—(U.S.) Notice of Allowance—U.S. Appl. No. 14/698,560.
Sep. 13, 2016—(CA) Office Action—App 2,902,206.
Sep. 14, 2016—(CA) Office Action—App 2,897,737.
Sep. 26, 2016—(CA) Office Action—App 2,902,158.
Oct. 26, 2016—(U.S.) Office Action U.S. Appl. No. 13/940,240.
Nov. 21, 2016—(U.S.) Office Action—U.S. Appl. No. 14/745,207.
Dec. 5, 2016—(U.S.) Notice of Allowance—U.S. Appl. No. 14/714,207.
Singh, Rajeev et al. "Detecting and Reducing the Denial of Service attacks in WLANs", Dec. 2011, World Congress on Information and Communication TEchnologies, pp. 968-973.
Feb. 10, 2017—(U.S.) Notice of Allowance—U.S. Appl. No. 14/625,486.
Feb. 15, 2017—(U.S.) Notice of Allowance—U.S. Appl. No. 14/921,718.
Apr. 12, 2017—(U.S.) Office Action—U.S. Appl. No. 14/757,638.
Mar. 6, 2017—(WO) International Search Report and Written Opinion—App PCT/US2016/068008.
Jun. 7, 2017—(U.S.) Office Action—U.S. Appl. No. 14/745,207.
Sep. 4, 2015 (U.S.) Notice of Allowance—U.S. Appl. No. 14/702,755.
Jun. 7, 2017—(WO) International Search Report and Written Opinion—App PCT/US2016/067111.
Aug. 15, 2017 (WO) International Preliminary Report on Patentability—App. PCT/US2015/062691.
Aug. 21, 2017 (AU) First Examination Report—App. 2015248067.
Sep. 29, 2017 (CA) Examination Report—App. 2,772,630.
Oct. 17, 2017 (WO) International Preliminary Report on Patentability—App. PCT/US2016/026339.
J. Xu et al., "Design and Evaluation of a High-Performance ATM Firewall Switch and Its Applications", IEEE Journal on Selected Areas in Communications, 17(6): 1190-1200, Jun. 1999.
C. Benecke, "A Parallel Packet Screen for High Speed Networks", Proceedings of the 15th Annual Computer Security Applications Conference, 1999.
R. Funke et al., "Performance Evaluation of Firewalls in Gigabit-Networks", Proceedings of the Symposium on Performance Evaluation of Computer and Telecommunication Systems, 1999.
S. Suri et al., "Packet Filtering in High Speed Networks", Proceedings of the Symposium on Discrete Algorithms, 969-970, 1999.
U. Ellermann et al., "Firewalls for ATM Networks", Proceedings of INFOSEC'COM, 1998.

(56) References Cited

OTHER PUBLICATIONS

V. Srinivasan et al., "Fast and Scalable Layer Four Switching", Proceedings of ACM SIGCOMM, 191-202, 1998.
M. Degermark et al., "Small Forwarding Tables for Fast Routing Lookups", Proceedings of ACM SIGCOMM, 4-13, 1997.
S,M. Bellovin et al., "Network Firewalls", IEEE Communications Magazine, 50-57, 1994.
W.E. Leland et al., "On the Self-Similar Nature of Ethernet Traffic", IEEE Transactions on Networking, 2(1); 15, 1994.
G. Brightwell et al., "Counting Linear Extensions is #P-Complete", Proceedings of the Twenty-Third Annual ACM Symposium on Theory of Computing, 1991.
M. Al-Suwaiyel et al., "Algorithms for Tile Compaction", ACM Transactions on Database Systems, 9(2): 243-263, Jun. 1984.
D. Comer, "Analysis of a Heuristic for Full Tile Minimization", ACM Transactions on Database Systems, 6(3): 513-537, Sep. 1981.
R.L. Graham et al., "Optimization and Approximation in Deterministic Sequencing and Scheduling: A Survey", Annals of Discrete Mathematics, 5: 287-326, 1979.
E.L. Lawler, "Sequencing Jobs to Minimize Total Weighted Completion oTime Subject to Precedence Constraints", Annals of Discrete Mathematics, 2: 75-90, 1978.
J.K. Lenstra et al., "Complexity of Scheduling Under Precedence Constraints", Operations Research, 26(1): 22-35,1978.
R. Rivest, "On Self-Organizing Sequential Search Heuristics", Communications of the ACM, 19(2): 1976.
W.E. Smith, "Various Optimizers for Single-Stage Productions", Naval Research Logistics Quarterly, 3: 59-66, 1956.
Bellion, "High Performance Packet Classification", http://www.hipac.org (Publication Date Unknown).
Oct. 18, 2011—(EP) Communication Pursuant to Article 94(3)—App 06 758 213.0.
Jun. 9, 2011—(U.S.) Notice of Allowance—U.S. Appl. No. 11/390,976.
Jun. 26, 2012—(EP) Extended Search Report—App 05857614.1.
Jun. 9, 2012—(AU) Notice of Acceptance—App 2006230171.
Nov. 11, 2011—(AU) Second Office Action—App 2006230171.
Jan. 17, 2013 (CA) Office Action—App 2,600,236.
Jan. 16, 2013—(CA) Office Action—App 2,594,020.
Nov. 20, 2012—(EP) Communication under rule 71(3)—App 06 758 213.0.
Apr. 18, 2013 (EP) Decision to Grant a European Patent—App 06758212.0.
Aug. 25, 2011—(U.S.) Non Final Rejection—U.S. Appl. No. 12/871,806.
Feb. 6, 2012—(U.S.) Final Rejection—U.S. Appl. No. 12/871,806.
Aug. 7, 2012—(U.S.) Non Final Rejection—U.S. Appl. No. 12/871,806.
Nov. 26, 2012—(U.S.) Final Rejection—U.S. Appl. No. 12/871,806.
Apr. 4, 2013—(U.S.) Notice of Allowance—U.S. Appl. No. 12/871,806.
Jan. 14, 2015—(EP) Extended Search Report—App 10819667.6.
May 26, 2014—(CA) Office Action—App 2010297968.
May 25, 2015—(AU) Notice of Acceptance—App 2010297968.
May 14, 2015—(U.S.) Non Final Rejection—U.S. Appl. No. 13/940,240.
Nov. 27, 2015—(U.S.) Final Rejection—U.S. Appl. No. 13/940,240.
Jul. 10, 2015—(WO) Communication Relating to the Results of the Partial International Search for International App—PCT/US2015/024691.
Jul. 14, 2015—(WO) International Preliminary Report on Patentability—App PCT/US2013/072566.
Jan. 28, 2016—(WO) International Search Report and Written Opinion—App PCT/US2015/062691.
Sep. 16, 2015 (WO) International Search Report and Written Opinion—App. No. PCT/US2015/024691.
Apr. 28, 2015 (WO) International Preliminary Report on Patentability—App. PCT/US2013/057502, dated Apr. 28, 2015.
Sep. 15, 2015 (WO) International Preliminary Report on Patentability—App. PCT/US2014/023286.
Sep. 15, 2015 (WO) International Preliminary Report on Patentability—App.—PCT/US2014/027723.
Statement RE: Related Application, dated Jul. 24, 2015.
Dec. 22, 2015—(U.S.) Final Office Action—U.S. Appl. No. 14/714,207.
Feb. 26, 2016—(U.S.) Non Final Office Action—U.S. Appl. No. 14/253,992.
Apr. 15, 2016—(U.S.) Notice of Allowance—U.S. Appl. No. 14/855,374.
Nov. 2, 2015—(AU) Office Action—App 2013372879.
Apr. 26, 2016—(U.S.) Office Action—U.S. Appl. No. 14/745,207.
Nov. 3, 2017 (U.S.) Non-Final Office Action—U.S. Appl. No. 15/413,834.
Nov. 21, 2017 (U.S.) Notice of Allowance—U.S. Appl. No. 14/690,302.
Sep. 5, 2017 (US) Memorandum in Support of Defendant's Ixia and Keysight Techonologies, Inc's Motion to Dismiss for Unpatentability Under 35 U.S.C. § 101—Case No. 2:17-cv-00383-HCM-LRL, Document 21, 29 pages.
Sep. 5, 2017 (US) Request for Judicial Notice in Support of Defendants Ixia and Keysight Technologies, Inc's Motion to Dismiss for Unpatentability under 35 U.S.C. § 101—Case No. 2:17-cv-00383-HCN-LRL, Document 22, 3 pages.
Jul. 20, 2017 (US) Complaint for Patent Infringement—Case No. 2:17-cv-00383-HCN-LRL, Document 1, 38 pages.
Sep. 5, 2017 (US) Defendant Ixia's Partial Answer to Complaint for Patent Infringement—Case No. 2:17-cv-00383-HCN-LRL, Document 29, 14 pages.
Nov. 29, 2017 (US) Defendant Keysight Technologies, Inc.'s Answer to Complaint for Patent Infringement—Case No. 2:17-cv-00383-HCN-LRL, Document 62, 20 pages.
Nov. 7, 2013 (WO) International Search Report—App. PCT/US2013/057502.
Jun. 24, 2014 (WO) International Search Report—App. PCT/US2014/023286.
Mar. 24, 2014 (WO) International Search Report—App. PCT/US2013/072566.
Jun. 26, 2014 (WO) International Search Report—App. PCT/US2014/027723.
"Control Plane Policing Implementation Best Practices"; Cisco Systems; Mar. 13, 2013; <https://web.archive.org/web/20130313135143/http:www.cisco.com/web/about/security/intelligence/coppwp_gs.html>.
Reumann, John; "Adaptive Packet Filters"; IEEE, 2001, Department of Electrical Engineering and Computer Science, The University of Michigan, Ann Arbor, MI.
Greenwald, Michael; "Designing an Academic Firewall: Policy, Practice, and Experience with SURF"; IEEE, Proceedings of SNDSS, 1996.
Mizuno et al., A New Remote Configurable Firewall System for Home-use Gateways, Jan. 2005. Second IEEE Consumer Communications and Networking Conference, pp. 599-601.
"SBIR Case Study: Centripetal Networks Subtitle: Flow CNI Leveraged DHS S&T SBIR Funding to Launch a Successful Cyber Security Division 2012 Principal Investigators' Meeting"; Sean Moore, Oct. 10, 2014.
John Kindervag; "Build Security Into Your Network's DNA: The Zero Trust Network Architecture", Forrester Research Inc.; Nov. 5, 2010, pp. 1-26.
Palo Alto Networks; "Designing A Zero Trust Network With Next-Generation Firewalls"; pp. 1-10; last viewed on Oct. 21, 2012.
Jan. 11, 2016—(U.S.) Non Final Rejection—U.S. Appl. No. 14/698,560.
Apr. 27, 2011 (WO) International Search Report and Written Opinion—App PCT/US2010/054520.
Mar. 4, 2011 (U.S.) Notice of Allowance—U.S. Appl. No. 11/316,331.
Mar. 3, 2011 (EP) Communication Pursuant to Rules 70(2) and 70a(2)—App 06758213.0.
Feb. 14, 2011—(EP) Search Report—App 06758213.0.
Fulp, Errin: "Errin Fulp," XP002618346, www.cs.wfu.edu/fulp/ewfPub.html, pp. 1-5 (Copyright 2010).
Sep. 30, 2010—(U.S.) Office Action—U.S. Appl. No. 11/390,976.
Sep. 10, 2010—(AU) Office Action—App 2006230171.
Aug. 20, 2010—(AU) Office Action—App 2005328336.
Jun. 23, 2010 (U.S.) Final Rejection—U.S. Appl. No. 11/316,331.
Apr. 29, 2010—(US) Interview Summary—U.S. Appl. No. 11/390,976.
Mar. 26, 2010—(U.S.) Final Rejection—U.S. Appl. No. 11/390,976.
Sep. 14, 2009 (U.S.) Office Action—U.S. Appl. No. 11/316,331.
Jun. 24, 2009—(U.S.) Office Action—U.S. Appl. No. 11/390,976.

(56) References Cited

OTHER PUBLICATIONS

Jul. 3, 2008—(WO) Written Opinion of the International Searching Authority—App PCT/US06/11291.
Aug. 31, 2007—(EP) Communication Pursuant to Rules 109 and 110—App 05857614.1.
Acharya et al, "OPTWALL: A Hierarchical Traffic-Aware Firewall," Department of Computer Science, Telecommunications Program, University of Pittsburgh, pp. 1-11 (2007).
Sep. 11, 2006—(WO) Written Opinion of the International Searching Authority—App PCT/US05/47008.
Tarsa et al., "Balancing Trie-Based Policy representations for Network Firewalls," Department of Computer Science, Wake Forest University, pp. 1-6 (2006).
Fulp, "Trie-Based Policy Representations for Network Firewalls," Proceedings of the IEEE International Symposium on Computer Communications (2005).
E. Fulp, "Optimization of Network Firewall Policies Using Ordered Sets and Directed Acyclical Graphs", Technical Report, Computer Scient Department, Wake Forest University, Jan. 2004.
E- Fulp et al., "Network Firewall Policy Tries", Technical Report, Computer Science Department, Wake Forest University, 2004.
E. Al-Shaer et al., "Modeling and Management of Firewall Policies", IEEE Transactions on Network and Service Management, 1(1): 2004.
E.W. Fulp, "Firewall Architectures for High Speed Networks", U.S. Department of Energy Grant Application, Funded Sep. 2003.
E. Al-Shaer et al., "Firewall Policy Advisor for Anomaly Discovery and Rule Editing", Proceedings of the IFIP/IEEE International Symposium on Integrated Network Management, 2003.
V.P. Ranganath, "A Set-Based Approach to Packet Classification", Proceedings of the IASTED International Conference on Parallel and Distributed Computing and Systems, 889-894, 2003.
M. Christiansen et al., "Using IDDsfor Packet Filtering", Technical Report, BRICS, Oct. 2002.
Lee et al., "Development Framework for Firewall Processors," IEEE, pp. 352-355 (2002).
L. Qui et al., "Fast Firewall Implementations for Software and Hardware-Based Routers", Proceedings of ACM Sigmetncs, Jun. 2001.
D. Eppstein et al., "Internet Packet Filter Management and Rectangle Geometry", Proceedings of the Symposium on Discrete Algorithms, 827-835, 2001.
E. Fulp, "Preventing Denial of Service Attacks on Quality of Service", Proceedings of the 2001 DARPA Information Survivability Conference and Exposition II, 2001.
S. Goddard et al., "An Unavailability Analysis of Firewall Sandwich Configurations", Proceedings of the 6th IEEE Symposium on High Assurance Systems Engineering, 2001.
G.V. Rooij, "Real Stateful TCP Packet Filtering in IP Filter", Proceedings of the 10th USENIX Security Symposium, 2001.
P. Warkhede et al., "Fast Packet Classification for Two-Dimensional Conflict-Free Filters", Proceedings of IEEE INFOCOM, 1434-1443, 2001.
D. Decasper et al., "Router Plugins: A Software Architecture for Next-Generation Routers", IEEE/ACM Transactions on Networking, 8(1): Feb. 2000.
A. Feldmann et al., "Tradeoffs for Packet Classification", Proceedings of the IEEE INFOCOM, 397-413, 2000.
X. Gan et al., "LSMAC vs. LSNAT: Scalable Cluster-based Web servers", Journal of Networks, Software Tools, and Applications, 3(3): 175-185, 2000.
A. Hari et al., "Detecting and Resolving Packet Filter Conflicts", Proceedings of IEEE INFOCOM, 1203-1212, 2000.
O. Paul et al., "A full Bandwidth ATM Firewall", Proceedings of the 6th European Symposium on Research in Computer Security ESORICS'2000, 2000.

\* cited by examiner

218

Rule(s)

402 Non-Threat-Intel. Rule(s)

| Rule | Criteria | Operator |
|---|---|---|
| NTI001 | <criteria> | <BLOCK> |
| NTI002 | <criteria> | <BLOCK> |
| ... | ... | ... |
| NTI999 | <criteria> | <ALLOW> |

404 Threat-Intel. Rule(s)

| Rule | Threat ID | Criteria | Operator |
|---|---|---|---|
| TI001 | Threat_1 | <criteria> | <ALLOW> |
| TI002 | Threat_2 | <criteria> | <ALLOW> |
| TI003 | Threat_3 | <criteria> | <ALLOW> |
| TI004 | Threat_4 | <criteria> | <ALLOW> |
| TI005 | Threat_5 | <criteria> | <ALLOW> |
| TI006 | Threat_6 | <criteria> | <ALLOW> |
| TI007 | Threat_7 | <criteria> | <ALLOW> |
| TI008 | Threat_8 | <criteria> | <ALLOW> |
| TI009 | Threat_9 | <criteria> | <ALLOW> |
| ... | ... | ... | ... |
| TI999 | Threat_N | <criteria> | <ALLOW> |

402 — Rule(s)

Non-Threat-Intel. Rule(s)

| Rule | Criteria | Operator |
|---|---|---|
| NTI001 | <criteria> | <BLOCK> |
| NTI002 | <criteria> | <BLOCK> |
| ... | ... | ... |
| NTI999 | <criteria> | <ALLOW> |

404 —

Threat-Intel. Rule(s)

| Rule | Threat ID | Criteria | Operator |
|---|---|---|---|
| TI001 | Threat_1 | <criteria> | <ALLOW> |
| TI002 | Threat_2 | <criteria> | <ALLOW> |
| TI003 | Threat_3 | <criteria> | <BLOCK> |
| TI004 | Threat_4 | <criteria> | <ALLOW> |
| TI005 | Threat_5 | <criteria> | <ALLOW> |
| TI006 | Threat_6 | <criteria> | <ALLOW> |
| TI007 | Threat_7 | <criteria> | <ALLOW> |
| TI008 | Threat_8 | <criteria> | <ALLOW> |
| TI009 | Threat_9 | <criteria> | |
| ... | ... | ... | ... |
| TI999 | Threat_N | <criteria> | <ALLOW> |

FIG. 4B

Log(s)

Packet Log

| Time | Packet Info. | Env. Vars. | Threat ID | Disp. |
|---|---|---|---|---|
| 01 | <info.> | <vars.> | Threat_3 | A |
| 02 | <info.> | <vars.> | Threat_3 | A |
| 03 | <info.> | <vars.> | Threat_3 | A |
| 08 | <info.> | <vars.> | Threat_5 | A |
| 10 | <info.> | <vars.> | Threat_5 | A |
| 12 | <info.> | <vars.> | Threat_5 | A |
| 14 | <info.> | <vars.> | Threat_5 | A |
| 21 | <info.> | <vars.> | Threat_1 | A |
| 22 | <info.> | <vars.> | Threat_1 | A |
| 23 | <info.> | <vars.> | Threat_1 | A |
| 26 | <info.> | <vars.> | Threat_3 | B |
| 27 | <info.> | <vars.> | Threat_3 | B |
| 28 | <info.> | <vars.> | Threat_3 | B |

Flow Log

| Time Range | Consolidated Info. | Threat ID | Counts |
|---|---|---|---|
| [01, 03] | <info. vars.> | Threat_3 | A=03 B=00 |
| [08, 14] | <info. vars.> | Threat_5 | A=04 B=00 |
| [21, 23] | <info. vars.> | Threat_1 | A=03 B=00 |

FIG. 5D

Packet Log

| Time | Packet Info. | Env. Vars. | Threat ID | Disp. |
|---|---|---|---|---|
| 01 | <info.> | <vars.> | Threat_3 | A |
| 02 | <info.> | <vars.> | Threat_3 | A |
| 03 | <info.> | <vars.> | Threat_3 | A |
| 08 | <info.> | <vars.> | Threat_5 | A |
| 10 | <info.> | <vars.> | Threat_5 | A |
| 12 | <info.> | <vars.> | Threat_5 | A |
| 14 | <info.> | <vars.> | Threat_5 | A |
| 21 | <info.> | <vars.> | Threat_1 | A |
| 22 | <info.> | <vars.> | Threat_1 | A |
| 23 | <info.> | <vars.> | Threat_1 | A |
| 26 | <info.> | <vars.> | Threat_3 | B |
| 27 | <info.> | <vars.> | Threat_3 | B |
| 28 | <info.> | <vars.> | Threat_3 | B |
| 82 | <info.> | <vars.> | Threat_3 | B |
| 83 | <info.> | <vars.> | Threat_3 | B |
| 84 | <info.> | <vars.> | Threat_3 | B |

Flow Log

| Time Range | Consolidated Info. | Threat ID | Counts |
|---|---|---|---|
| [01, 28] | <info. vars.> | Threat_3 | A=03 B=03 |
| [08, 14] | <info. vars.> | Threat_5 | A=04 B=00 |
| [21, 23] | <info. vars.> | Threat_1 | A=03 B=00 |

FIG. 5E

Log(s)

Packet Log

| Time | Packet Info. | Env. Vars. | Threat ID | Disp. |
|---|---|---|---|---|
| 01 | <info.> | <vars.> | Threat_3 | A |
| 02 | <info.> | <vars.> | Threat_3 | A |
| 03 | <info.> | <vars.> | Threat_3 | A |
| 08 | <info.> | <vars.> | Threat_5 | A |
| 10 | <info.> | <vars.> | Threat_5 | A |
| 12 | <info.> | <vars.> | Threat_5 | A |
| 14 | <info.> | <vars.> | Threat_1 | A |
| 21 | <info.> | <vars.> | Threat_1 | A |
| 22 | <info.> | <vars.> | Threat_1 | A |
| 23 | <info.> | <vars.> | Threat_1 | A |
| 26 | <info.> | <vars.> | Threat_3 | B |
| 27 | <info.> | <vars.> | Threat_3 | B |
| 28 | <info.> | <vars.> | Threat_3 | B |
| 82 | <info.> | <vars.> | Threat_3 | B |
| 83 | <info.> | <vars.> | Threat_3 | B |
| 84 | <info.> | <vars.> | Threat_3 | B |
| 92 | <info.> | <vars.> | Threat_1 | B |
| 93 | <info.> | <vars.> | Threat_1 | B |
| 94 | <info.> | <vars.> | Threat_1 | B |
| 95 | <info.> | <vars.> | Threat_1 | B |
| 96 | <info.> | <vars.> | Threat_1 | B |
| 97 | <info.> | <vars.> | Threat_1 | B |

Flow Log

| Time Range | Consolidated Info. | Threat ID | Counts |
|---|---|---|---|
| [01, 84] | <info. vars.> | Threat_3 | A=03 B=06 |
| [08, 14] | <info. vars.> | Threat_5 | A=04 B=00 |
| [21, 23] | <info. vars.> | Threat_1 | A=03 B=00 |

Log(s)

Packet Log

| Time | Packet Info. | Env. Vars. | Threat ID | Disp. |
|------|-------------|-----------|-----------|-------|
| 01 | <info.> | <vars.> | Threat_3 | A |
| 02 | <info.> | <vars.> | Threat_3 | A |
| 03 | <info.> | <vars.> | Threat_3 | A |
| 08 | <info.> | <vars.> | Threat_5 | A |
| 10 | <info.> | <vars.> | Threat_5 | A |
| 12 | <info.> | <vars.> | Threat_5 | A |
| 14 | <info.> | <vars.> | Threat_1 | A |
| 21 | <info.> | <vars.> | Threat_1 | A |
| 22 | <info.> | <vars.> | Threat_1 | A |
| 23 | <info.> | <vars.> | Threat_3 | B |
| 26 | <info.> | <vars.> | Threat_3 | B |
| 27 | <info.> | <vars.> | Threat_3 | B |
| 28 | <info.> | <vars.> | Threat_3 | B |
| 82 | <info.> | <vars.> | Threat_3 | B |
| 83 | <info.> | <vars.> | Threat_3 | B |
| 84 | <info.> | <vars.> | Threat_3 | B |
| 92 | <info.> | <vars.> | Threat_1 | B |
| 93 | <info.> | <vars.> | Threat_1 | B |
| 94 | <info.> | <vars.> | Threat_1 | B |
| 95 | <info.> | <vars.> | Threat_1 | B |
| 96 | <info.> | <vars.> | Threat_1 | B |
| 97 | <info.> | <vars.> | Threat_1 | B |

Flow Log

| Time Range | Consolidated Info. | Threat ID | Counts |
|-----------|-------------------|-----------|--------|
| [01, 84] | <info. vars.> | Threat_3 | A=03 B=06 |
| [08, 14] | <info. vars.> | Threat_5 | A=04 B=00 |
| [21, 97] | <info. vars.> | Threat_1 | A=03 B=06 |

RULE-BASED NETWORK-THREAT DETECTION

CROSS-REFERENCE TO RELATED APPLICATIONS

This application is a Continuation co-pending U.S. patent application Ser. No. 14/690,302, filed Apr. 17, 2015, the content of which is hereby incorporated by reference into the present application.

BACKGROUND

Network security is becoming increasingly important as the information age continues to unfold. Network threats may take a variety of forms (e.g., unauthorized requests or data transfers, viruses, malware, large volumes of network traffic designed to overwhelm network resources, and the like). Many organizations subscribe to network-threat services that periodically provide information associated with network threats, for example, reports that include listings of network-threat indicators (e.g., network addresses, uniform resources identifiers (URIs), and the like). The information provided by such services may be utilized by organizations to identify network threats. For example, logs generated by the organization's network devices may be reviewed for data corresponding to the network-threat indicators provided by such services. But because the logs are generated based on the traffic processed by the network devices without regard to the network-threat indicators, this process is often tedious and time consuming and is exacerbated by the continuously evolving nature of potential threats. Accordingly, there is a need for rule-based network-threat detection.

SUMMARY

The following presents a simplified summary in order to provide a basic understanding of some aspects of the disclosure. It is intended neither to identify key or critical elements of the disclosure nor to delineate the scope of the disclosure. The following summary merely presents some concepts of the disclosure in a simplified form as a prelude to the description below.

Aspects of this disclosure relate to rule-based network-threat detection. In accordance with embodiments of the disclosure, a packet-filtering device may receive packet-filtering rules configured to cause the packet-filtering device to identify packets corresponding to network-threat indicators. The packet-filtering device may receive packets and, for each packet, may determine that the packet corresponds to criteria specified by a packet-filtering rule. The criteria may correspond to one or more of the network-threat indicators. The packet-filtering device may apply an operator specified by the packet-filtering rule. The operator may be configured to cause the packet-filtering device to either prevent the packet from continuing toward its destination or allow the packet to continue toward its destination. The packet-filtering device may generate a log entry comprising information from the packet-filtering rule that identifies the one or more network-threat indicators and indicating whether the packet-filtering device prevented the packet from continuing toward its destination or allowed the packet to continue toward its destination.

In some embodiments, the packet-filtering device may generate and communicate to a user device data indicating whether the packet-filtering device prevented the packet from continuing toward its destination or allowed the packet to continue toward its destination. The user device may receive the data and indicate in an interface displayed by the user device whether the packet-filtering device prevented the packet from continuing toward its destination or allowed the packet to continue toward its destination. The interface may comprise an element that when invoked by a user of the user device causes the user device to instruct the packet-filtering device to reconfigure the operator to prevent future packets corresponding to the criteria from continuing toward their respective destinations.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein:

FIGS. 4A, 4B, and 4C depict illustrative packet-filtering rules for rule-based network-threat detection in accordance with one or more aspects of the disclosure;

FIGS. 5A, 5B, 5C, 5D, 5E, 5F, and 5G depict illustrative logs for rule-based network-threat detection in accordance with one or more aspects of the disclosure;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the disclosure.

Various connections between elements are discussed in the following description. These connections are general and, unless specified otherwise, may be direct or indirect, wired or wireless. In this respect, the specification is not intended to be limiting.

Figure 1:
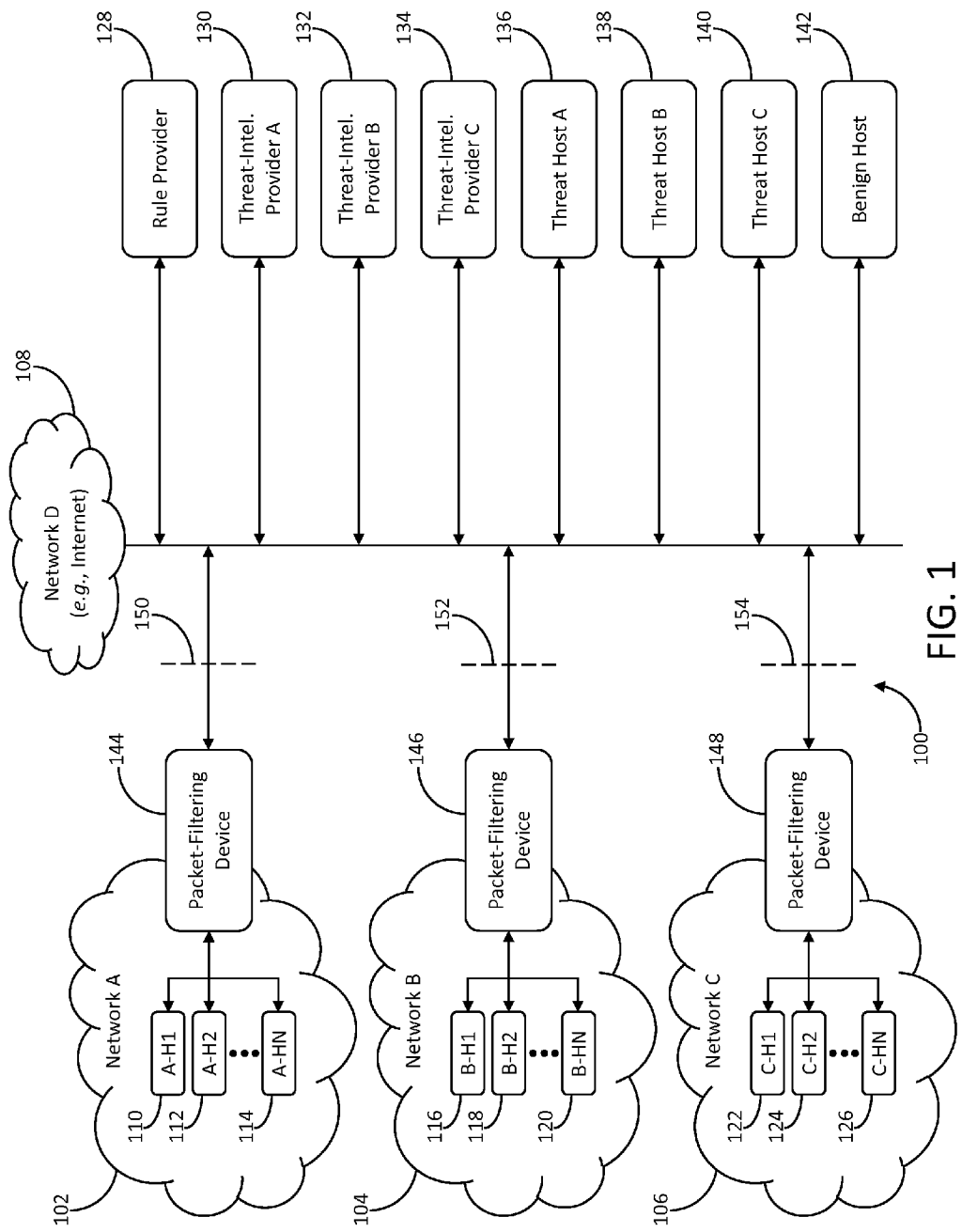
FIG. 1 depicts an illustrative environment for rule-based network-threat detection in accordance with one or more aspects of the disclosure.

FIG. 1 depicts an illustrative environment for rule-based network-threat detection in accordance with one or more aspects of the disclosure. Referring to FIG. 1, environment 100 may include one or more networks. For example, environment 100 may include networks 102, 104, 106, and 108. Networks 102, 104, and 106 may comprise one or more networks (e.g., Local Area Networks (LANs), Wide Area Networks (WANs), Virtual Private Networks (VPNs), or combinations thereof) associated with one or more individuals or entities (e.g., governments, corporations, service providers, or other organizations). Network 108 may comprise one or more networks (e.g., LANs, WANs, VPNs, or combinations thereof) that interface networks 102, 104, and 106 with each other and one or more other networks (not illustrated). For example, network 108 may comprise the Internet, a similar network, or portions thereof.

Environment 100 may also include one or more hosts, such as computing or network devices (e.g., servers, desktop computers, laptop computers, tablet computers, mobile devices, smartphones, routers, gateways, switches, access points, or the like). For example, network 102 may include hosts 110, 112, and 114, network 104 may include hosts 116, 118, and 120, network 106 may include hosts 122, 124, and 126, and network 108 may interface networks 102, 104, and 106 with one or more hosts associated with rule provider 128 or network-threat-intelligence providers 130, 132, and 134, threat hosts 136, 138, and 140, and benign host 142. Network-threat-intelligence providers 130, 132, and 134 may be associated with services that monitor network threats (e.g., threats associated with threat hosts 136, 138, and 140) and disseminate (e.g., to subscribers) network-threat-intelligence reports that include network-threat indicators (e.g., network addresses, ports, fully qualified domain names (FQDNs), uniform resource locators (URLs), uniform resource identifiers (URIs), or the like) associated with the network threats, as well as other information associated with the network threats, for example, the type of threat (e.g., phishing malware, botnet malware, or the like), geographic information (e.g., International Traffic in Arms Regulations (ITAR) country, Office of Foreign Assets Control (OFAC) country, or the like), anonymous proxies (e.g., Tor network, or the like), actors (e.g., the Russian Business Network (RBN), or the like).

Environment 100 may further include packet-filtering devices 144, 146, and 148. Packet-filtering device 144 may be located at boundary 150 between networks 102 and 108. Similarly, packet-filtering device 146 may be located at boundary 152 between networks 104 and 108, and packet-filtering device 148 may be located at boundary 154 between networks 106 and 108.

Figure 2A:
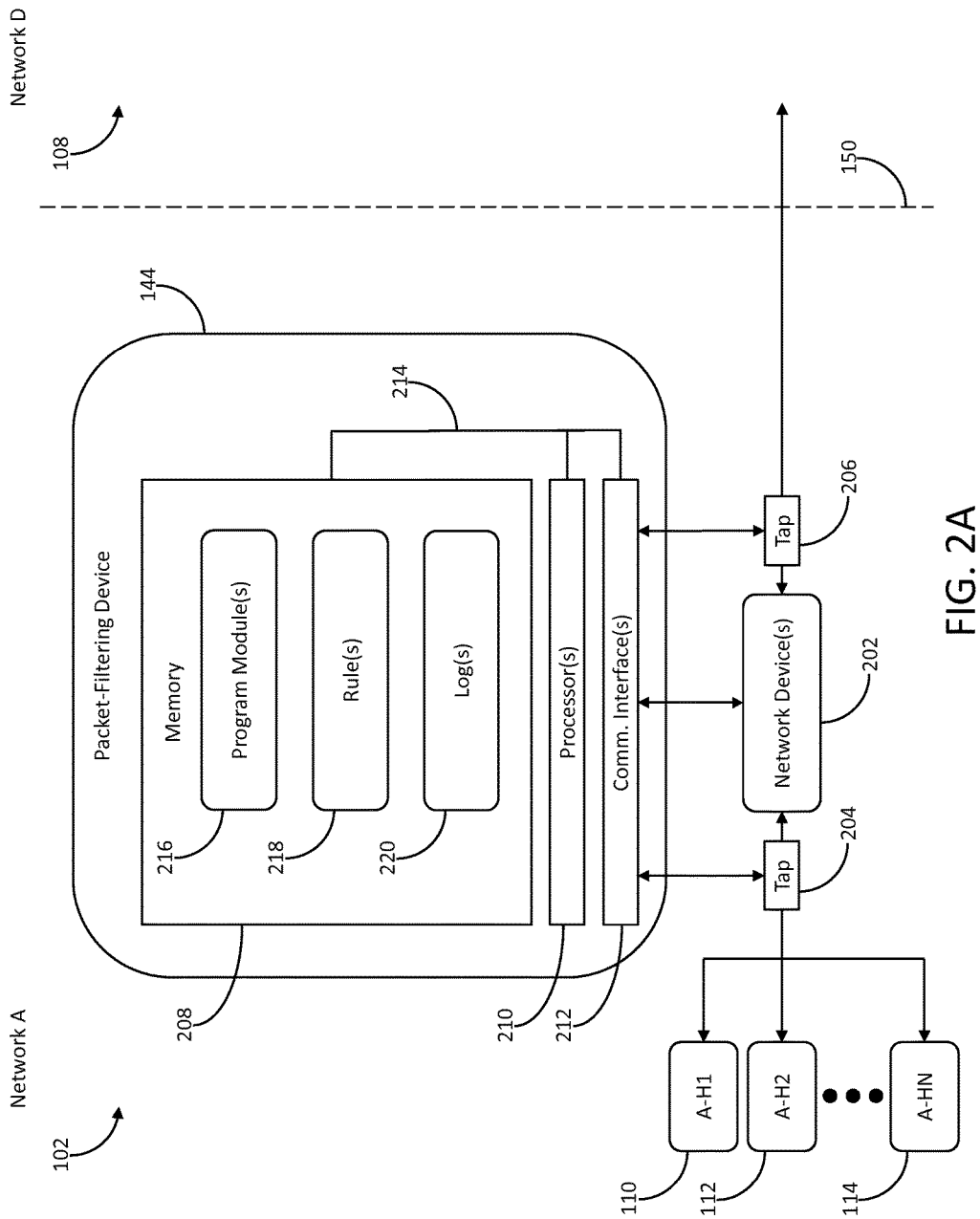
FIGS. 2A and 2B depict illustrative devices for rule-based network-threat detection in accordance with one or more aspects of the disclosure.
Figure 2B:
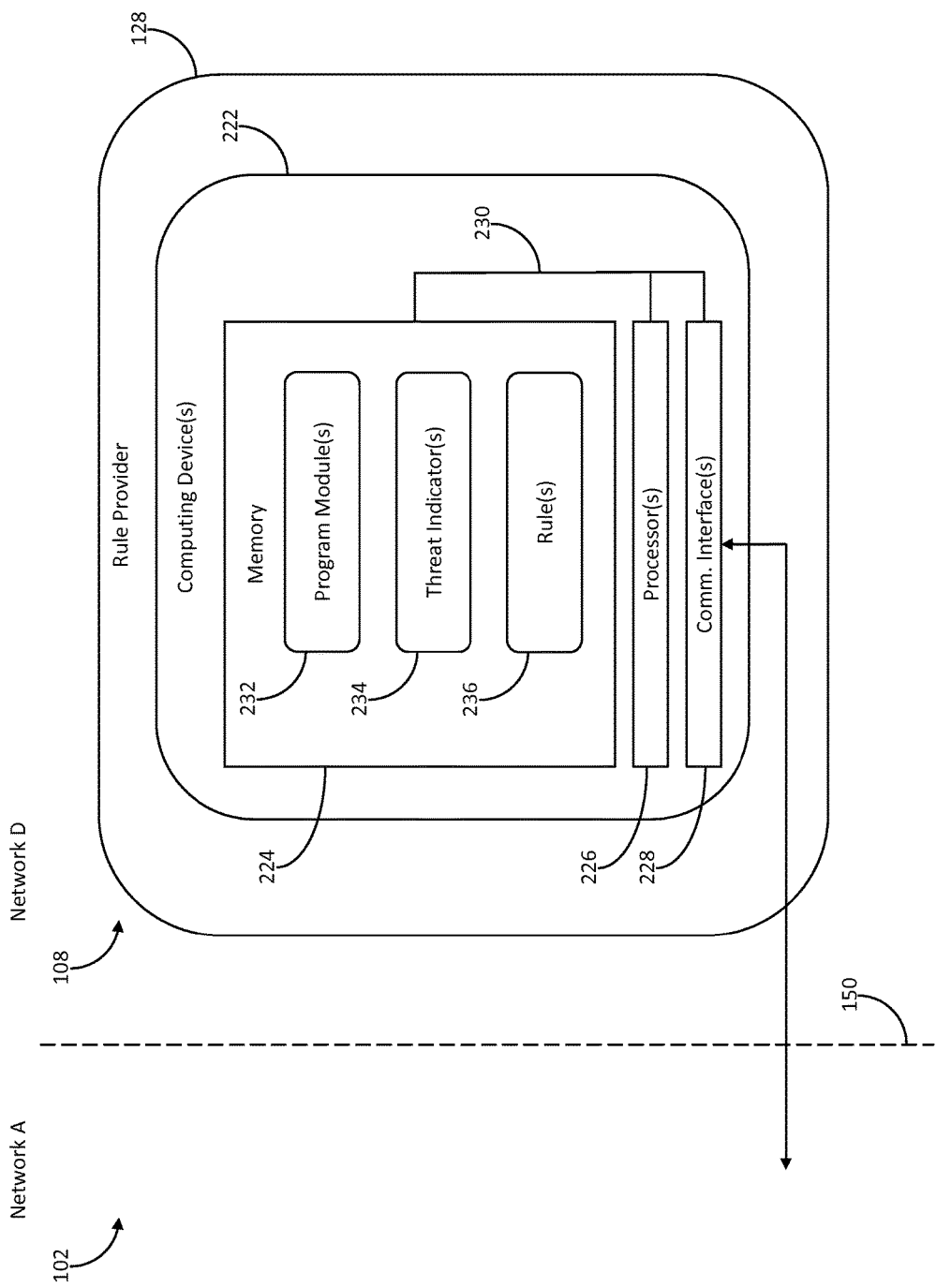

FIGS. 2A and 2B depict illustrative devices for rule-based network-threat detection in accordance with one or more aspects of the disclosure.

Referring to FIG. 2A, as indicated above, packet-filtering device 144 may be located at boundary 150 between networks 102 and 108. Network 102 may include one or more network devices 202 (e.g., servers, routers, gateways, switches, access points, or the like) that interface hosts 110, 112, and 114 with network 108. Network 102 may also include tap devices 204 and 206. Tap device 204 may be located on or have access to a communication path that interfaces network devices 202 and network 102 (e.g., one or more of hosts 110, 112, and 114). Tap device 206 may be located on or have access to a communication path that interfaces network devices 202 and network 108. Packet-filtering device 144 may include memory 208, one or more processors 210, one or more communication interfaces 212, and data bus 214. Data bus 214 may interface memory 208, processors 210, and communication interfaces 212. Communication interfaces 212 may interface packet-filtering device 144 with network devices 202 and tap devices 204 and 206. Memory 208 may comprise one or more program modules 216, one or more packet-filtering rules 218, and one or more logs 220. Program modules 216 may comprise instructions that when executed by processors 210 cause packet-filtering device 144 to perform one or more of the functions described herein. Networks 104 and 106 may each comprise components similar to those described herein with respect to network 102, and packet-filtering devices 146 and 148 may each comprise components similar to those described herein with respect to packet-filtering device 144.

Referring to FIG. 2B, rule provider 128 may include one or more computing devices 222. Computing devices 222 may include memory 224, one or more processors 226, one or more communication interfaces 228, and data bus 230. Data bus 230 may interface memory 224, processors 226, and communication interfaces 228. Communication interfaces 228 may interface computing devices 222 with network 108, which, as indicated above, may interface with network 102 at boundary 150. Memory 224 may comprise one or more program modules 232, one or more network-threat indicators 234, and one or more packet-filtering rules 236. Program modules 232 may comprise instructions that when executed by processors 226 cause computing devices 222 to perform one or more of the functions described herein.

FIGS. 3A, 3B, 3C, 3D, 3E, and 3F depict an illustrative event sequence for rule-based network-threat detection in accordance with one or more aspects of the disclosure. In reviewing the illustrative event sequence, it will be appreciated that the number, order, and timing of the illustrative events is simplified for the purpose of illustration and that additional (unillustrated) events may occur, the order and time of events may differ from the depicted illustrative events, and some events or steps may be omitted, combined, or occur in an order other than that depicted by the illustrative event sequence.

Figure 3A:
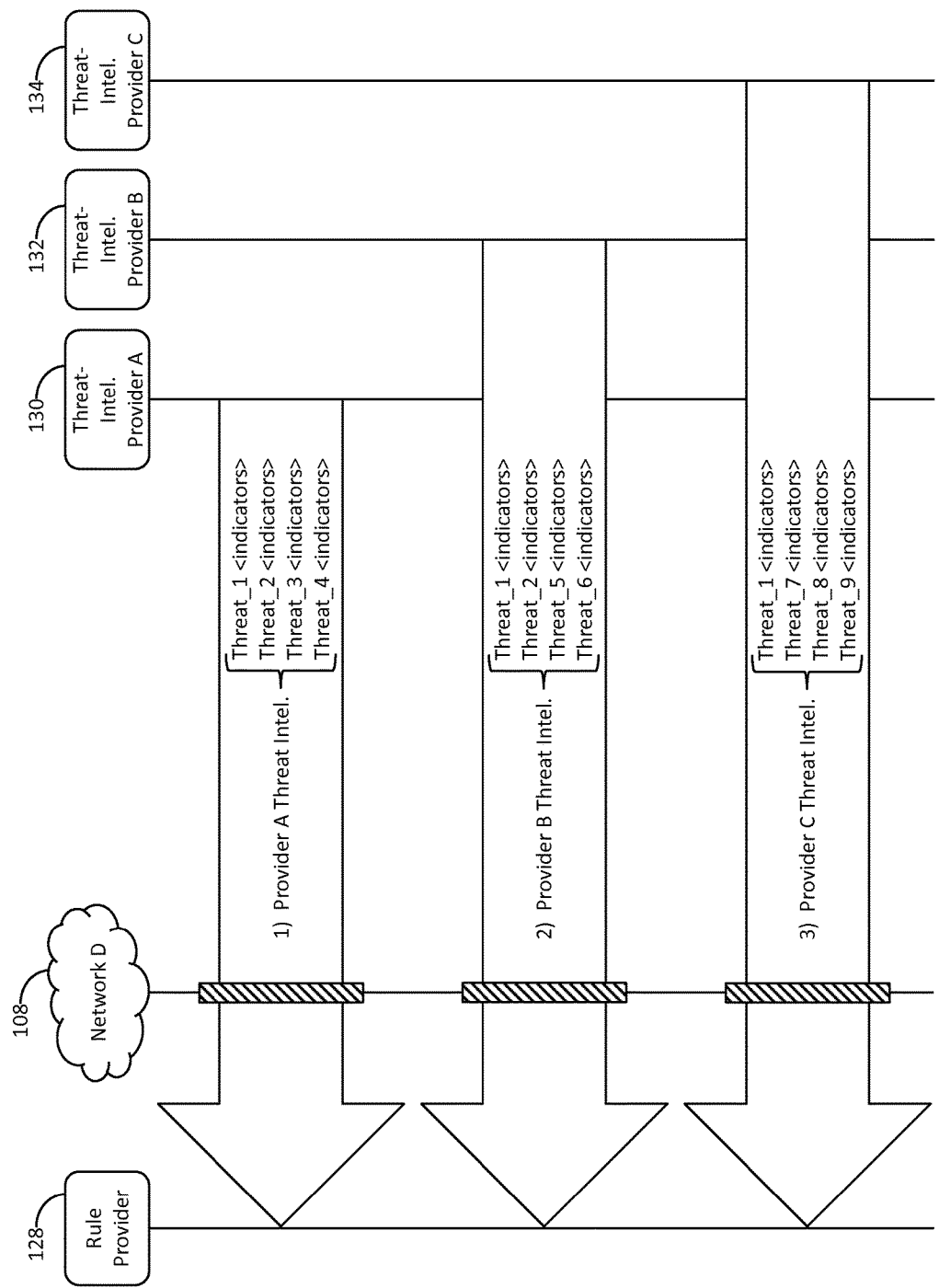
FIGS. 3A, 3B, 3C, 3D, 3E, and 3F depict an illustrative event sequence for rule-based network-threat detection in accordance with one or more aspects of the disclosure.

Referring to FIG. 3A, at step 1, network-threat-intelligence provider 130 may communicate to rule provider 128 (e.g., via network 108, as designated by the shaded box over the line extending downward from network 108) one or more network-threat-intelligence reports identifying one or more network threats (e.g., Threat_1, Threat_2, Threat_3, and Threat_4) and comprising one or more associated network-threat indicators (e.g., network addresses, ports, FQDNs, URLs, URIs, or the like), as well as other information associated with the network threats (e.g., the type of threat, geographic information, anonymous proxies, actors, or the like). Similarly, at step 2, network-threat-intelligence provider 132 may communicate to rule provider 128 one or more network-threat-intelligence reports identifying one or more network threats (e.g., Threat_1, Threat_2, Threat_5, and Threat_6) and comprising one or more associated network-threat indicators, as well as other information associated with the network threats, and, at step 3, network-threat-intelligence provider 134 may communicate to rule provider 128 one or more network-threat-intelligence reports identifying one or more network threats (e.g., Threat_1, Threat_7, Threat_8, and Threat_9) and comprising one or more associated network-threat indicators, as well as other information associated with the network threats. Rule provider 128 (e.g., computing devices 222) may receive (e.g., via communication interfaces 228) the network-threat-intelligence reports communicated by network-threat-intelligence providers 130, 132, and 134, and may store data contained therein in memory 224 (e.g., network-threat indicators 234).

Figure 3B:
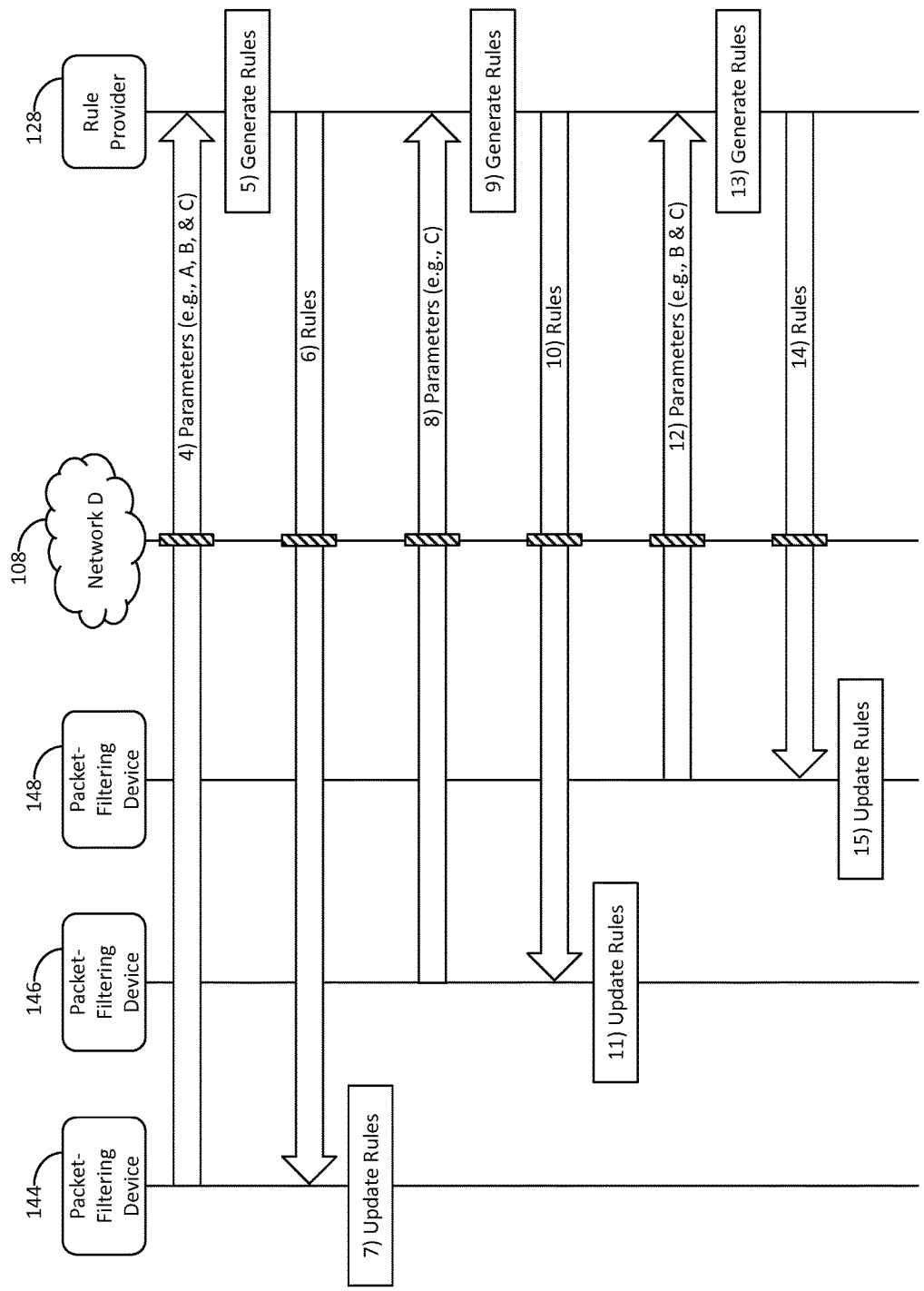

Referring to FIG. 3B, at step 4, packet-filtering device 144 may communicate one or more parameters to rule provider 128 (e.g., parameters indicating a preference, authorization, subscription, or the like to receive packet-filtering rules generated based on network-threat-intelligence reports provided by network-threat-intelligence providers 130, 132, and 134). At step 5, rule provider 128 (e.g., computing devices 222) may generate one or more packet-filtering rules (e.g., packet-filtering rules 236) based on the network-threat-intelligence reports provided by network-threat-intelligence providers 130, 132, and 134 (e.g., network-threat indicators 234) and, at step 6, may communicate the packet-filtering rules to packet-filtering device 144, which, at step 7, may update packet-filtering rules 218 to include the packet-filtering rules generated by rule provider 128 in step 5.

Figure 4C:
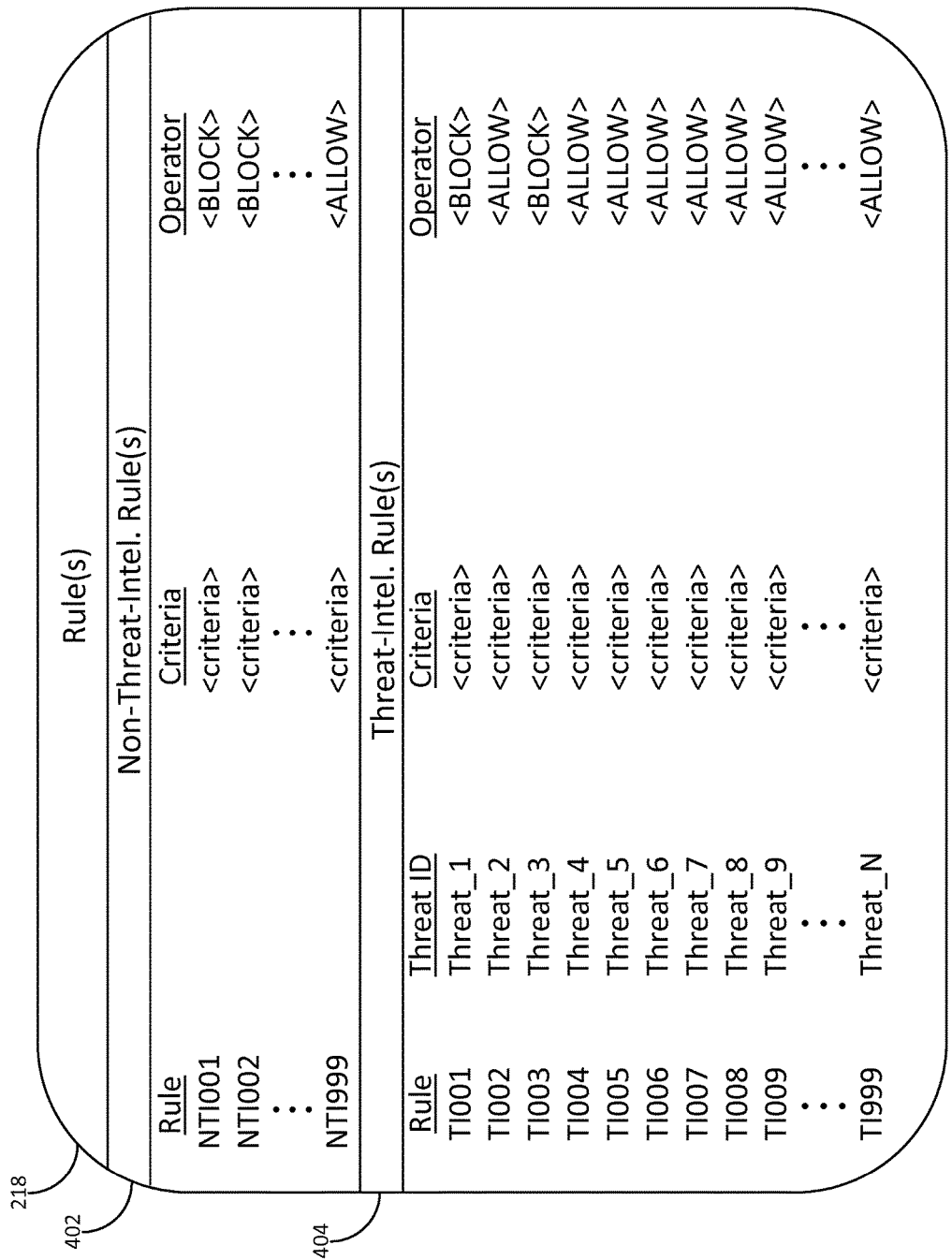

For example, referring to FIG. 4A, packet-filtering rules 218 may include packet-filtering rules 402 that comprise non-network-threat-intelligence rules (e.g., packet-filtering rules generated by an administrator of network 102) and packet-filtering rules 404 that comprise network-threat-intelligence rules (e.g., the packet-filtering rules communicated by rule provider 128 in step 6). Each of the network-threat-intelligence rules may comprise: one or more criteria that correspond to one or more of network-threat indicators 234 upon which the rule is based and may be configured to cause packet-filtering device 144 to identify packets corresponding to the criteria (e.g., corresponding to the network-threat indicators upon which the rule is based); an operator configured to cause packet-filtering device 144 to either prevent packets corresponding to the criteria from continuing toward their respective destinations (e.g., a BLOCK operator) or allow packets corresponding to the criteria to continue toward their respective destinations (e.g., an ALLOW operator); and information distinct from the criteria (e.g., a Threat ID) that identifies one or more of the network-threat indicators upon which the rule is based, one or more network threats associated with the network-threat indicators, one or more network-threat-intelligence reports that included the network-threat indicators, one or more of network-threat-intelligence providers 130, 132, or 134 that provided the network-threat-intelligence reports, or other information contained in the network-threat-intelligence reports that is associated with the network-threat indicators or the network threats (e.g., the type of threat, geographic information, anonymous proxies, actors, or the like).

Returning to FIG. 3B, at step 8, packet-filtering device 146 may communicate one or more parameters to rule provider 128 (e.g., parameters indicating a preference, authorization, subscription, or the like to receive packet-filtering rules generated based on network-threat-intelligence reports provided by network-threat-intelligence provider 134). At step 9, rule provider 128 may generate one or more packet-filtering rules based on the network-threat-intelligence reports provided by network-threat-intelligence provider 134 (e.g., network-threat indicators 234 (or a portion thereof included in network-threat-intelligence reports received from network-threat-intelligence provider 134)) and, at step 10, may communicate the packet-filtering rules to packet-filtering device 146, which, at step 11, may update its packet-filtering rules to include the packet-filtering rules generated by rule provider 128 in step 9. Similarly, at step 12, packet-filtering device 148 may communicate one or more parameters to rule provider 128 (e.g., parameters indicating a preference, authorization, subscription, or the like to receive packet-filtering rules generated based on network-threat-intelligence reports provided by network-threat-intelligence providers 132 and 134). At step 13, rule provider 128 may generate one or more packet-filtering rules based on the network-threat-intelligence reports provided by network-threat-intelligence providers 132 and 134 (e.g., network-threat indicators 234 (or a portion thereof included in network-threat-intelligence reports received from network-threat-intelligence providers 132 and 134)) and, at step 14, may communicate the packet-filtering rules to packet-filtering device 148, which, at step 15, may update its packet-filtering rules to include the packet-filtering rules generated by rule provider 128 in step 13.

Figure 3C:
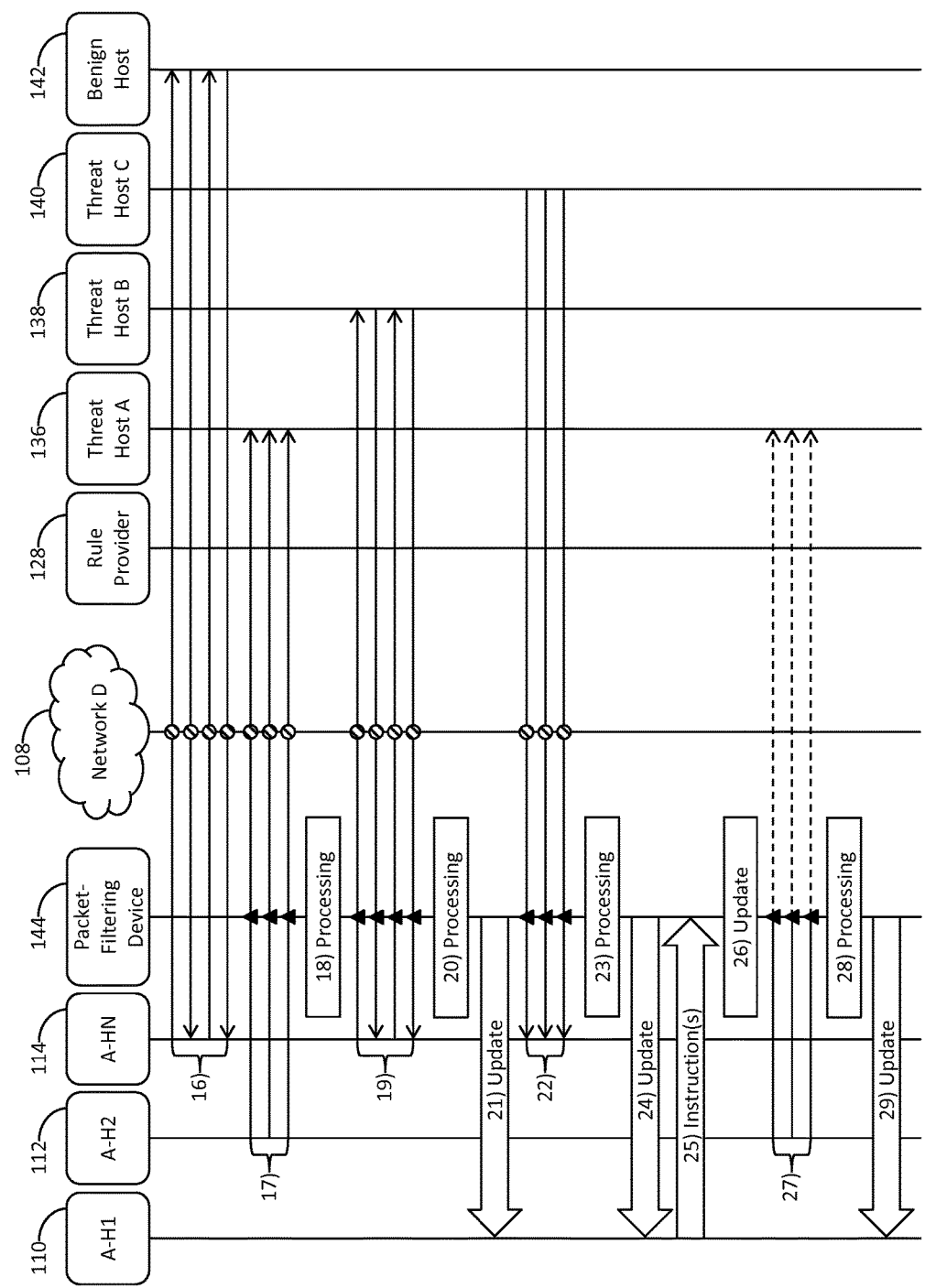

Referring to FIG. 3C, at step 16, four packets may be communicated (e.g., via network 108, as designated by the shaded circles over the line extending downward from network 108) between host 114 and benign host 142 (e.g., two packets originating from host 114 and destined for benign host 142 and two packets originating from benign host 142 and destined for host 114), and packet-filtering device 144 may receive each of the four packets (e.g., via tap devices 204 and 206), apply one or more of packet-filtering rules 218 to the four packets, and allow the four packets to continue toward their respective destinations.

At step 17, three packets may be communicated by host 112 to threat host 136, and packet-filtering device 144 may receive each of the three packets, apply one or more of packet-filtering rules 218 to the three packets, determine that each of the three packets corresponds to criteria specified by a packet-filtering rule of packet-filtering rules 404 (e.g., Rule: TI003), apply an operator specified by the packet-filtering rule (e.g., an ALLOW operator) to each of the three packets, allow each of the three packets to continue toward its respective destination (e.g., toward threat host 136), and generate log data for each of the three packets (as designated by the triangles over the line extending downward from packet-filtering device 144).

Figure 5A:
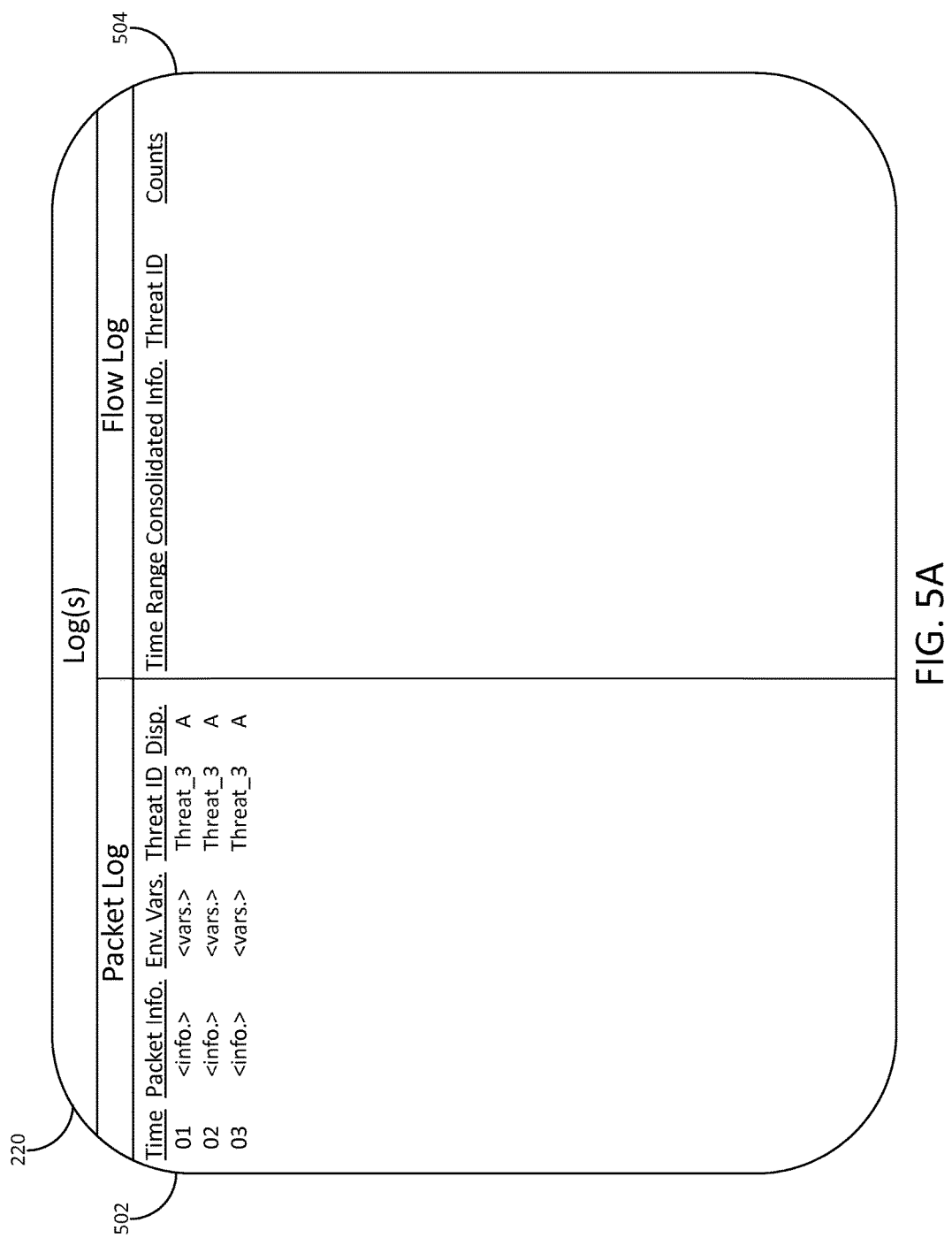

At step 18, packet-filtering device 144 may begin processing the log data generated in step 17. For example, referring to FIG. 5A, logs 220 may include packet log 502 and flow log 504, each of which (or portions thereof) may be reserved or distinguished for entries associated with packets corresponding to criteria included in packet-filtering rules 404, and packet-filtering device 144 may generate an entry in packet log 502 for each of the three packets. Each entry may comprise data indicating a hit time for the packet (e.g., a time at which the packet was received by packet-filtering device 144, identified by packet-filtering device 144, or the like), data derived from the packet (e.g., a source address, a destination address, a port number, a protocol type, a domain name, URL, URI, or the like), one or more environmental variables (e.g., an identifier of an interface of packet-filtering device 144 over which the packet was received, an identifier of an interface of packet-filtering device 144 over which the packet was forwarded toward its destination, an identifier associated with packet-filtering device 144 (e.g., distinguishing packet-filtering device 144 from packet-filtering devices 146 and 148), or the like), data identifying the packet-filtering rule of packet-filtering rules 404 to which the packet corresponded (e.g., Thread ID: Threat_3), and data indicating whether packet-filtering device 144 prevented the packet from continuing toward its destination or allowed the packet to continue toward its destination (e.g., the character A may designate that packet-filtering device 144 allowed the packet to continue toward its destination, and the character B may designate that packet-filtering device 144 prevented the packet from continuing toward its destination).

Returning to FIG. 3C, at step 19, four packets may be communicated between host 114 and threat host 138 (e.g., two packets originating from host 114 and destined for threat host 138 and two packets originating from threat host 138 and destined for host 114), and packet-filtering device 144 may receive each of the four packets, apply one or more of packet-filtering rules 218 to the four packets, determine that each of the four packets corresponds to criteria specified by a packet-filtering rule of packet-filtering rules 404 (e.g., Rule: TI005), apply an operator specified by the packet-filtering rule (e.g., an ALLOW operator) to each of the four packets, allow each of the four packets to continue toward its respective destination, and generate log data for each of the four packets. In some embodiments, the criteria specified by one or more of packet-filtering rules 404 (e.g., the criteria generated from the network-threat indicators) may include network addresses and one or more of the packets received by packet-filtering device 144 may comprise domain names, URIs, or URLs. In such embodiments, packet-filtering device 144 may comprise a local domain name system (DNS) cache (e.g., stored in memory 208) and may utilize the local DNS cache to resolve one or more of the domain names, URIs, or URLs included in the packets into one or more of the network addresses included in the criteria.

Figure 5B:
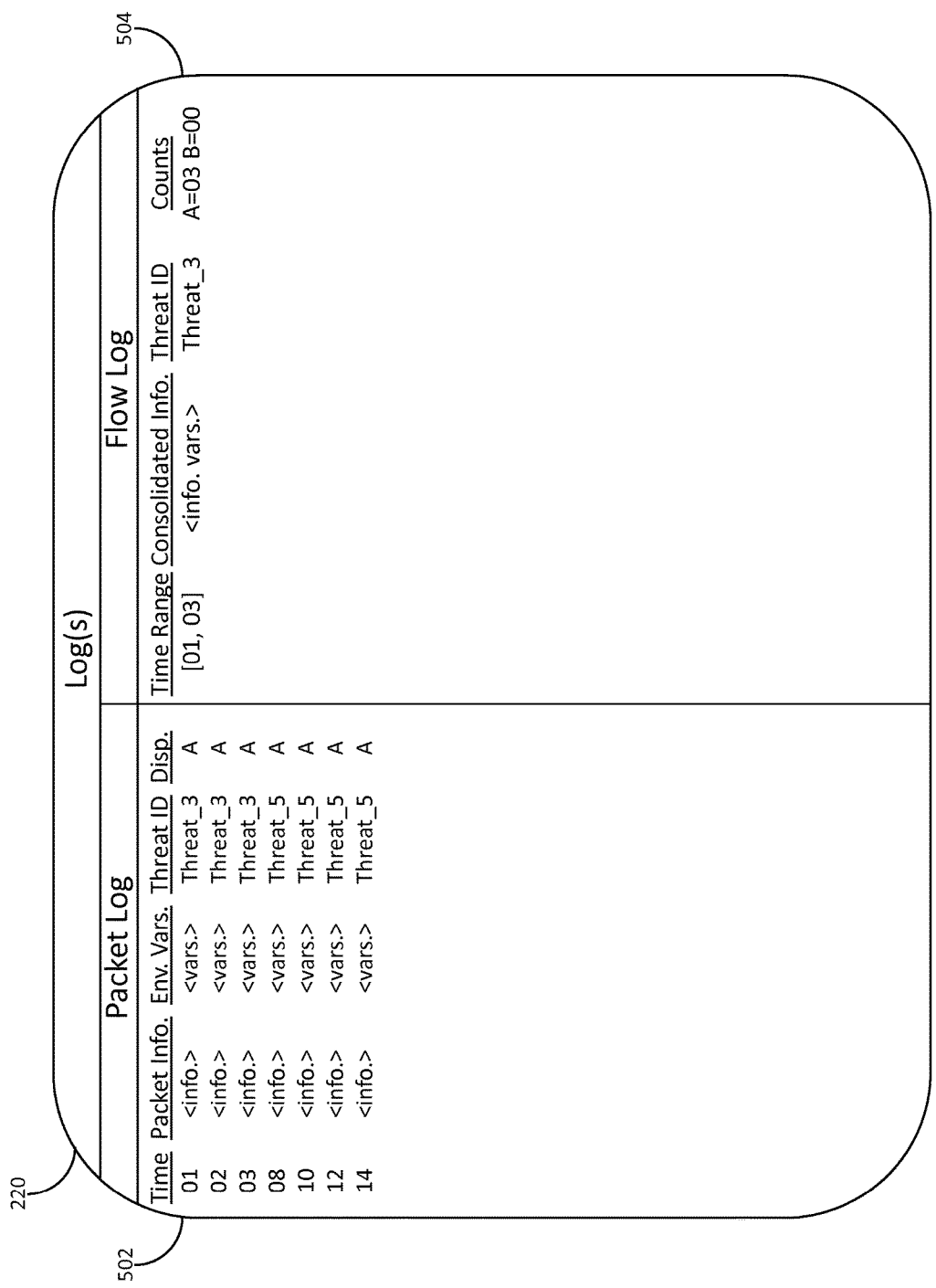

At step 20, packet-filtering device 144 may continue processing the log data generated in step 17 and may begin processing the log data generated in step 19. In some embodiments, packet-filtering device 144 may be configured in accordance with work-conserving scheduling in order to minimize latency (e.g., the time between when a packet corresponding to a network threat crosses boundary 150 and the time when an administrator associated with network 102 is presented with an interface indicating that the packet corresponding to the network threat has crossed boundary 150). For example, referring to FIG. 5B, packet-filtering device 144 may generate entries in packet log 502 for each of the packets received in step 19 while generating an entry in flow log 504 for the packets received in step 17. Packet-filtering device 144 may generate the entry in flow log 504 for the packets received in step 17 based on the entries generated in packet log 502 (e.g., in step 18) for the packets received in step 17. The entry in flow log 504 may consolidate, compress, or summarize the entries in packet log 502. For example, the entry in flow log 504 may comprise a time range (e.g., [01, 03]) indicating the earliest hit time indicated by the entries (e.g., Time: 01) to the latest hit time indicated by the entries (e.g., Time: 03), consolidated information from the entries (e.g., a consolidation of the information derived from the packets and the environmental variables), information that each of the associated packets have in common (e.g., Threat ID: Threat_3), a count of the associated packets allowed by packet-filtering device 144 to continue toward their respective destinations, and a count of the associated packets prevented by packet-filtering device 144 from continuing toward their respective destinations.

Returning to FIG. 3C, at step 21, packet-filtering device 144 may utilize flow log 504 to generate data comprising an update for an interface associated with packet-filtering device 144 and displayed by host 110, and may communicate the data comprising the update to host 110. For example, referring to FIG. 6A, host 110 may be a user device associated with an administrator of network 102 and configured to display interface 600. Interface 600 may include graphical depictions 602 and 604, which may illustrate activity associated with packet-filtering device 144. For example, graphical depiction 602 may comprise a line chart depicting, for a user-specified time interval, a number of packet hits, a number of packets prevented from continuing toward their respective destinations, a number of packets allowed to continue toward their respective destinations, or the like, and graphical depiction 604 may comprise an annulated pie chart illustrating percentages of hits during the user-specified time interval that are associated with various category types (e.g., type of network threat, geographic information, anonymous proxies, actors, or the like).

Interface 600 may also include listing 606, which may comprise entries corresponding to network threats and, for each threat, associated information derived by packet-filtering device 144 from flow log 504 (e.g., a description of the threat, information derived from the consolidated information stored in flow log 504, the time of the last associated packet hit, a count of associated packet hits, a count of associated packets allowed by packet-filtering device 144 to continue toward their respective destinations, a count of associated packets prevented by packet-filtering device 144 from continuing toward their respective destinations) and a status of the operator included in the rule associated with the threat.

Packet-filtering device 144 may be configured to determine an ordering of the network threats, and listing 606 may be displayed in accordance with the ordering determined by packet-filtering device 144. In some embodiments, packet-filtering device 144 may be configured to determine a score for each of the network threats and the ordering may be determined based on the scores. In such embodiments, the scores may be determined based on a number of associated packet hits, times associated with the packet hits (e.g., time of day, time since last hit, or the like), whether the packet was destined for a network address associated with a host in network 102 or a host in network 108, one or more network-threat-intelligence providers that provided the network-threat indicators associated with the threat, the number of network-threat intelligence providers that provided the network-threat indicators associated with the threat, other information associated with the network threat (e.g., type of network threat, geographic information, anonymous proxies, actors, or the like).

Figure 6A:
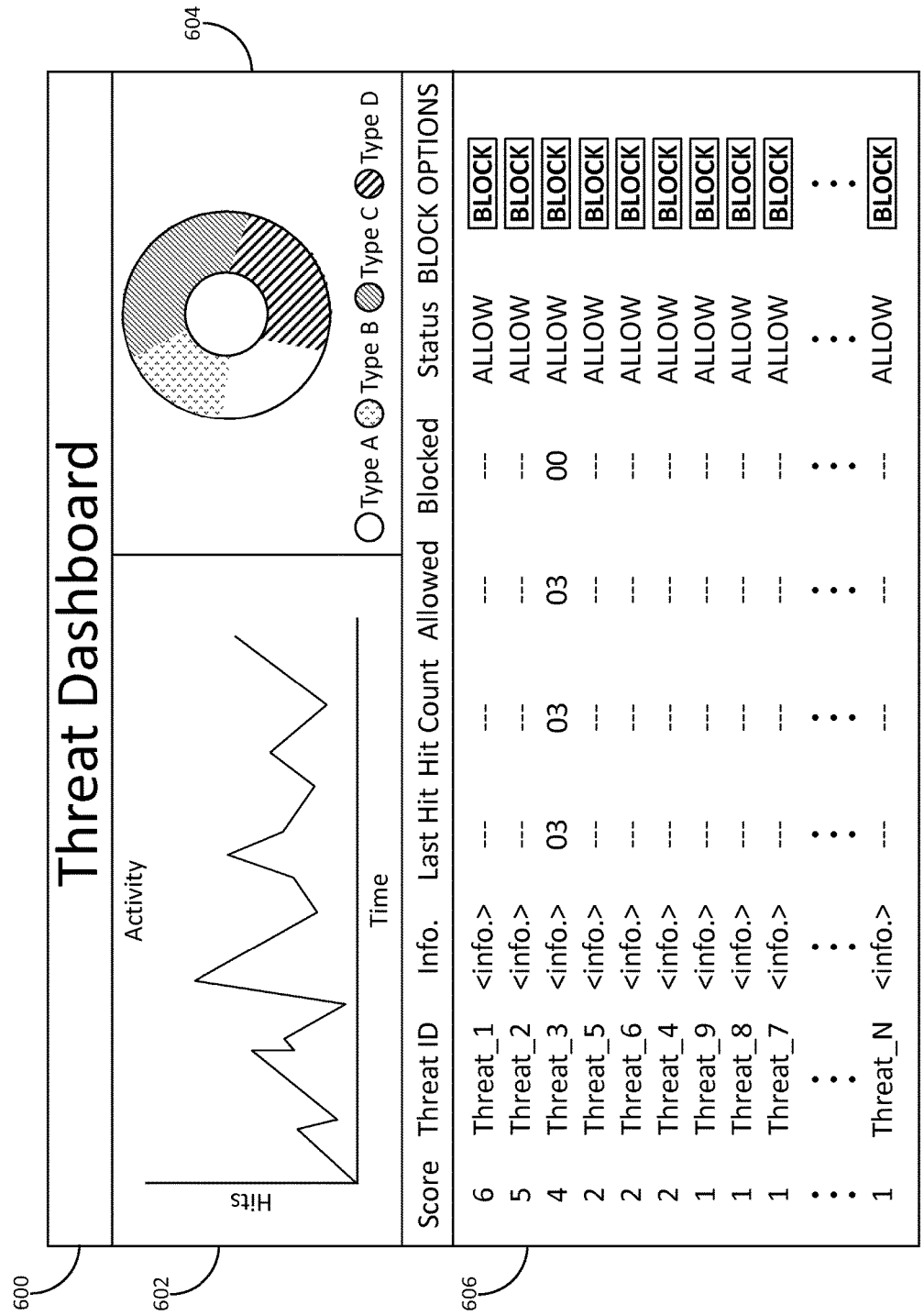
FIGS. 6A, 6B, 6C, 6D, 6E, 6F, and 6G depict illustrative interfaces for rule-based network-threat detection in accordance with one or more aspects of the disclosure.

For example, as illustrated in FIG. 6A, the threat associated with Threat ID: Threat_1 may be assigned a score (e.g., 6) higher than the score assigned to the threat associated with Threat ID: Threat_2 (e.g., 5) based on a determination that the network-threat-indicators corresponding to the threat associated with Threat ID: Threat_1 were received from three different network-threat-intelligence providers (e.g., network-threat-intelligence providers 130, 132, and 134) and a determination that the network-threat-indicators corresponding to the threat associated with Threat ID: Threat_2 were received from two different network-threat-intelligence providers (e.g., network-threat-intelligence providers 130 and 132). Similarly, the threat associated with Threat ID: Threat_2 may be assigned a score (e.g., 5) higher than the score assigned to the threat associated with Threat ID: Threat_3 (e.g., 4) based on a determination that the network-threat-indicators corresponding to the threat associated with Threat ID: Threat_2 were received from two different network-threat-intelligence providers (e.g., network-threat-intelligence providers 130 and 132) and a determination that the network-threat-indicators corresponding to the threat associated with Threat ID: Threat_3 were received from one network-threat-intelligence provider (e.g., network-threat-intelligence provider 130). Additionally, the threat associated with Threat ID: Threat_3 may be assigned a score (e.g., 4) higher than the score assigned to the threat associated with Threat ID: Threat_5 (e.g., 2) based on a determination that the last packet hit corresponding to the threat associated with Threat ID: Threat_3 is more recent than the last packet hit corresponding to the threat associated with Threat ID: Threat_5, and the threat associated with Threat ID: Threat_4 may be assigned a score (e.g., 2) higher than the score assigned to the threat associated with Threat ID: Threat_9 (e.g., 1) based on a determination that the network-threat-indicators corresponding to the threat associated with Threat ID: Threat_4 were received from network-threat-intelligence provider 130 and a determination that the network-threat-indicators corresponding to the threat associated with Threat ID: Threat_9 were received from network-threat-intelligence provider 134 (e.g., the network-threat-intelligence reports produced by network-threat-intelligence provider 130 may be regarded as more reliable than the network-threat-intelligence reports produced by network-threat-intelligence provider 134).

Returning to FIG. 3C, at step 22, three packets may be communicated by threat host 140 to host 114, and packet-filtering device 144 may receive each of the three packets, apply one or more of packet-filtering rules 218 to the three packets, determine that each of the three packets corresponds to criteria specified by a packet-filtering rule of packet-filtering rules 404 (e.g., Rule: TI001), apply an operator specified by the packet-filtering rule (e.g., an ALLOW operator) to each of the three packets, allow each of the three packets to continue toward its respective destination (e.g., toward host 114), and generate log data for each of the three packets.

Figure 5C:
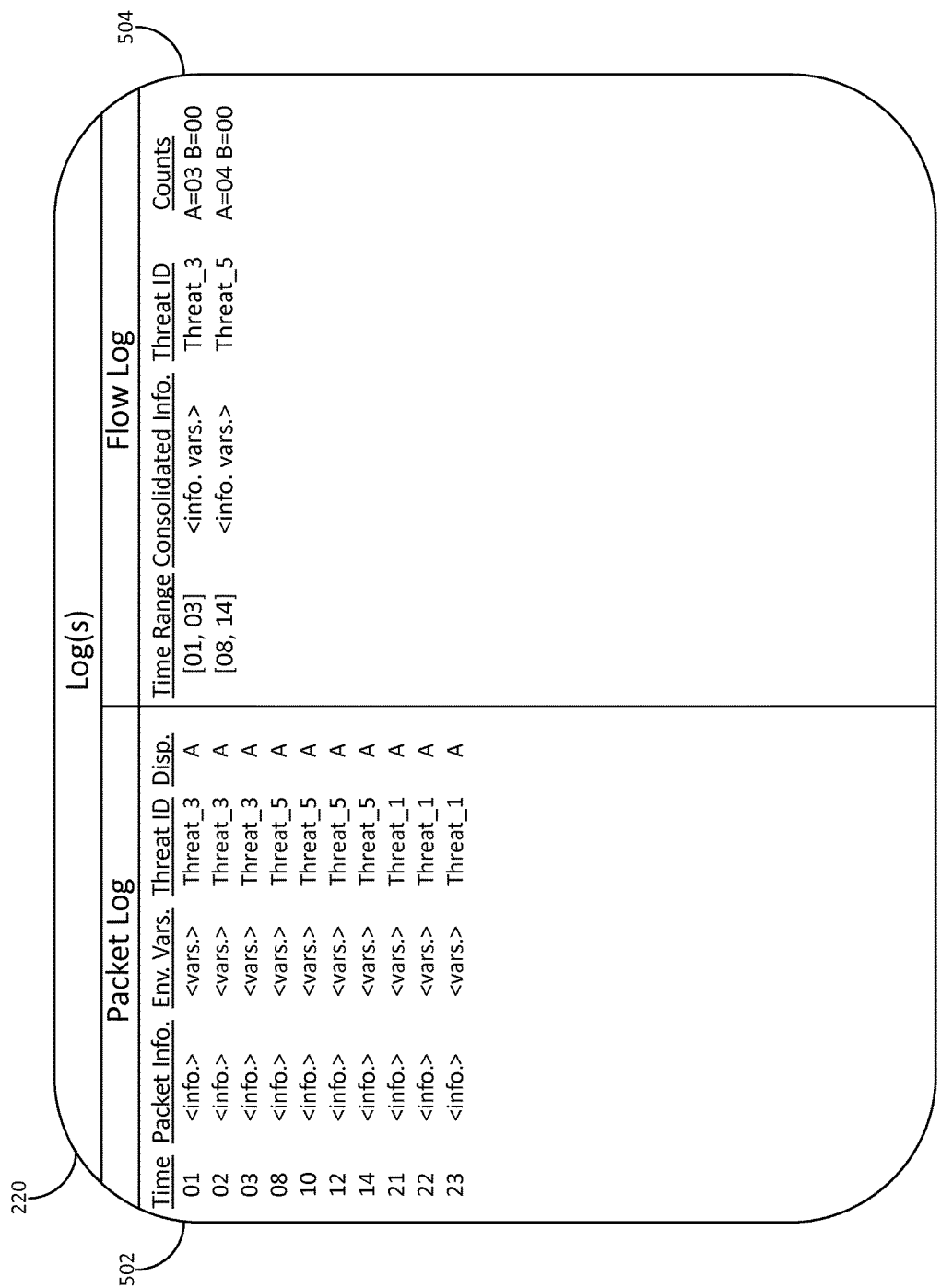

At step 23, packet-filtering device 144 may continue processing the log data generated in step 19 and may begin processing the log data generated in step 22. For example, referring to FIG. 5C, packet-filtering device 144 may generate entries in packet log 502 for each of the packets received in step 22 while generating an entry in flow log 504 for the packets received in step 19 based on the entries generated in packet log 502 (e.g., in step 20) for the packets received in step 19.

Figure 6B:
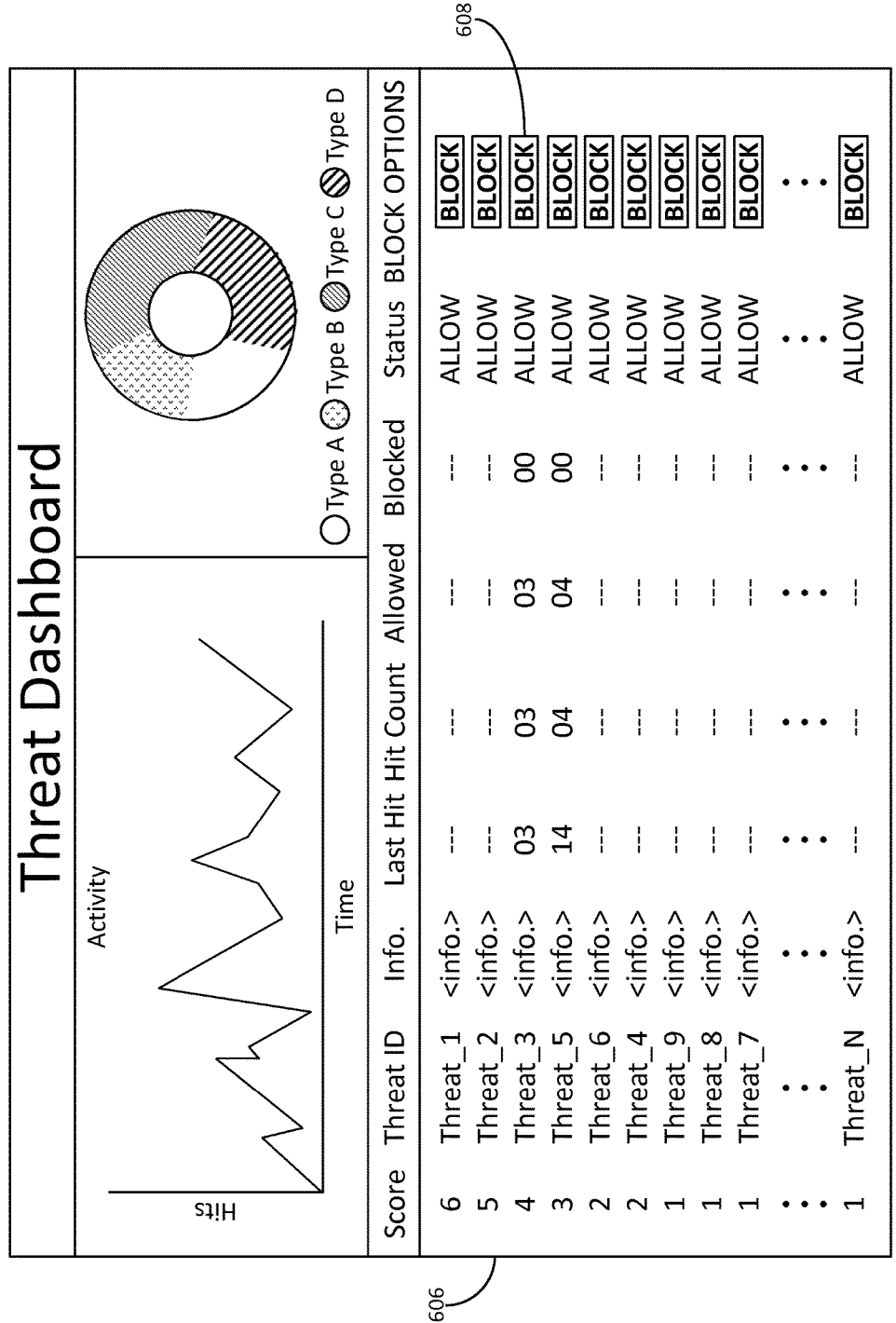

Returning to FIG. 3C, at step 24, packet-filtering device 144 may utilize flow log 504 to generate data comprising an update for interface 600 and may communicate the data to host 110. For example, referring to FIG. 6B, the update may cause interface 600 to update an entry in listing 606 corresponding to the threat associated with Threat ID: Threat_5 to reflect the packets received in step 19 and to reflect a new score (e.g., 3) assigned by packet-filtering device 144 to the threat associated with Threat ID: Threat_5 (e.g., the score may have increased based on the packets received in step 19).

Interface 600 may include one or more block options that when invoked by a user of host 110 (e.g., the administrator of network 102) cause host 110 to instruct packet-filtering device 144 to reconfigure an operator of a packet-filtering rule included in packet-filtering rules 404 to prevent packets corresponding to the criteria specified by the packet-filtering rule from continuing toward their respective destinations. In some embodiments, listing 606 may include such a block option alongside each entry, and, when invoked, the block option may cause host 110 to instruct packet-filtering device 144 to reconfigure an operator of packet-filtering rules 404 that corresponds to the network threat associated with the entry. For example, interface 600 may include block option 608, which, when invoked, may cause host 110 to instruct packet-filtering device 144 to reconfigure an operator associated with Rule: TI003 (e.g., to reconfigure the operator to cause packet-filtering device 144 to prevent packets corresponding to the one or more criteria specified by Rule: TI003 (e.g., packets corresponding to the network-threat-indicators associated with Threat ID: Threat_3) from continuing toward their respective destinations).

Figure 6C:
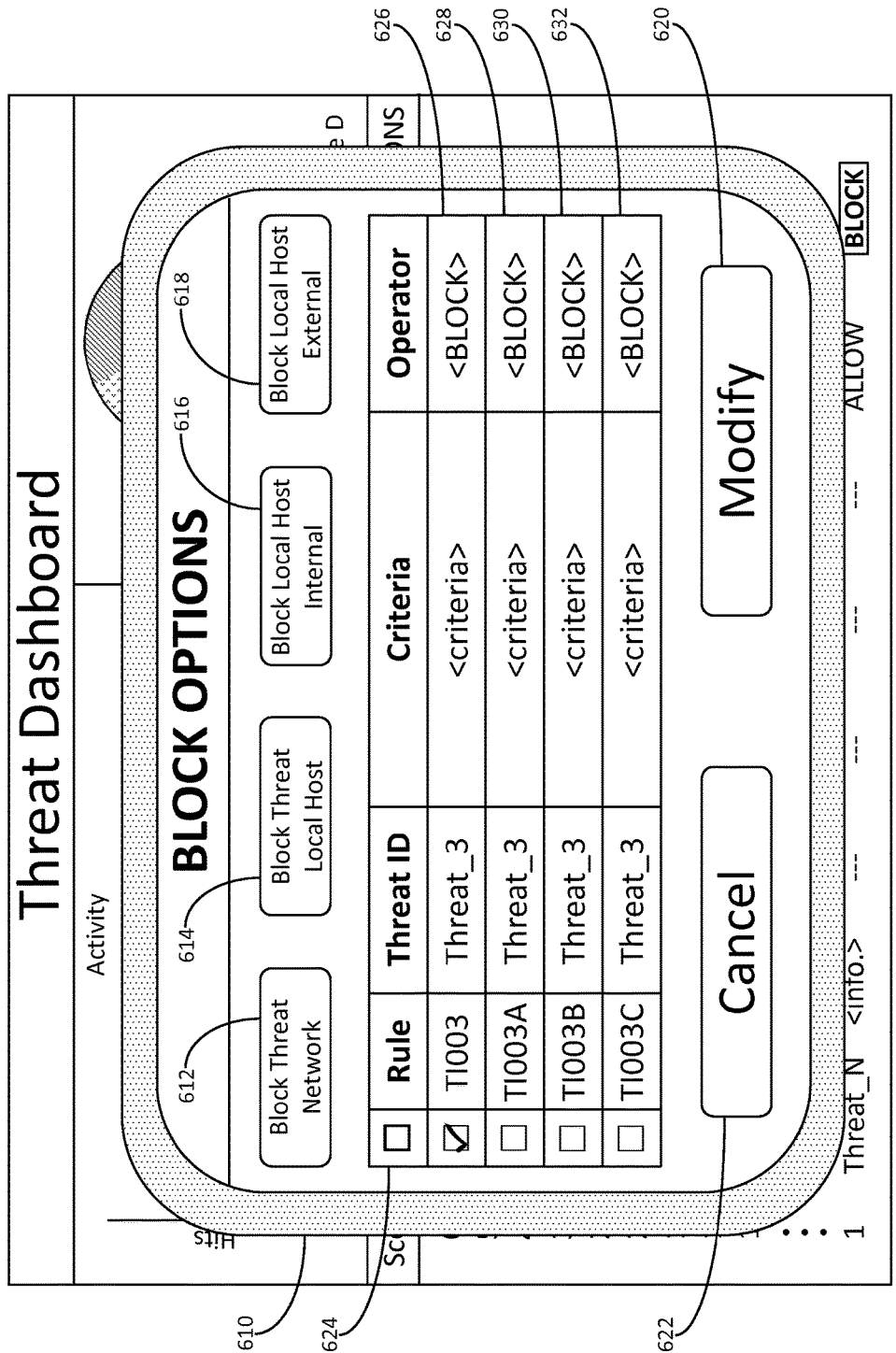

Additionally or alternatively, when invoked, such a block option may cause host 110 to display another interface (e.g., an overlay, pop-up interface, or the like) associated with packet-filtering device 144. For example, referring to FIG. 6C, when invoked, block option 608 may cause host 110 to display interface 610. Interface 610 may comprise specific block options 612, 614, 616, and 618, modify option 620, and cancel option 622. Specific block option 612 may correspond to an option to reconfigure packet-filtering device 144 to prevent packets corresponding to the network threat and destined for or originating from a host in network 102 from continuing toward their respective destinations. Specific block option 614 may correspond to an option to reconfigure packet-filtering device 144 to prevent packets corresponding to the network threat and destined for or originating from one or more particular hosts in network 102 that have generated or received packets associated with the network threat (e.g., host 112) from continuing toward their respective destinations. Specific block option 616 may correspond to an option to reconfigure packet-filtering device 144 to prevent any packets received from the particular hosts in network 102 that have generated or received packets associated with the network threat from continuing toward hosts located in network 102. And specific block option 618 may correspond to an option to reconfigure packet-filtering device 144 to prevent any packets received from the particular hosts in network 102 that have generated or received packets associated with the network threat from continuing toward hosts located in network 108.

Interface 610 may also include rule-preview listing 624, which may display a listing of rules that will be implemented by packet-filtering device 144 in response to the user invoking modify option 620. Rule-preview listing 624 may include one or more entries corresponding to each of specific block options 612, 614, 616, and 618. For example, entry 626 may correspond to, and display a rule configured to implement, specific block option 612 (e.g., Rule: TI003 with its operator reconfigured to BLOCK). Similarly, entries 628, 630, and 632 may correspond to, and display rules configured to implement, specific block options 614, 616, and 618 (e.g., one or more new rules generated by packet-filtering device 144 based on data derived from flow log 504 (e.g., a network address associated with host 112)). Responsive to a user invoking one or more of specific block options 612, 614, 616, or 618, the interface may select the corresponding rules, and responsive to a user invoking modify option 620, host 110 may instruct packet-filtering device 144 to implement the selected rules. Responsive to a user invoking cancel option 620, host 110 may redisplay interface 600.

Returning to FIG. 3C, at step 25, host 110 may communicate instructions to packet-filtering device 144 instructing packet-filtering device 144 to reconfigure one or more of packet-filtering rules 404 (e.g., to reconfigure the operator of Rule: TI003 to BLOCK), and, at step 26, packet-filtering device 144 may reconfigure packet-filtering rules 404 accordingly, as reflected in FIG. 4B.

At step 27, three packets destined for threat host 136 may be communicated by host 112, and packet-filtering device 144 may receive each of the three packets, apply one or more of packet-filtering rules 218 to the three packets, determine that each of the three packets corresponds to criteria specified by a packet-filtering rule of packet-filtering rules 404 (e.g., Rule: TI003), apply an operator specified by the packet-filtering rule (e.g., the BLOCK operator) to each of the three packets, prevent each of the three packets from continuing toward its respective destination (e.g., toward threat host 136), and generate log data for each of the three packets.

At step 28, packet-filtering device 144 may continue processing the log data generated in step 22 and may begin processing the log data generated in step 27. For example, referring to FIG. 5D, packet-filtering device 144 may generate entries in packet log 502 for each of the packets received in step 27 while generating an entry in flow log 504 for the packets received in step 22 based on the entries generated in packet log 502 (e.g., in step 23) for the packets received in step 22.

Figure 6D:
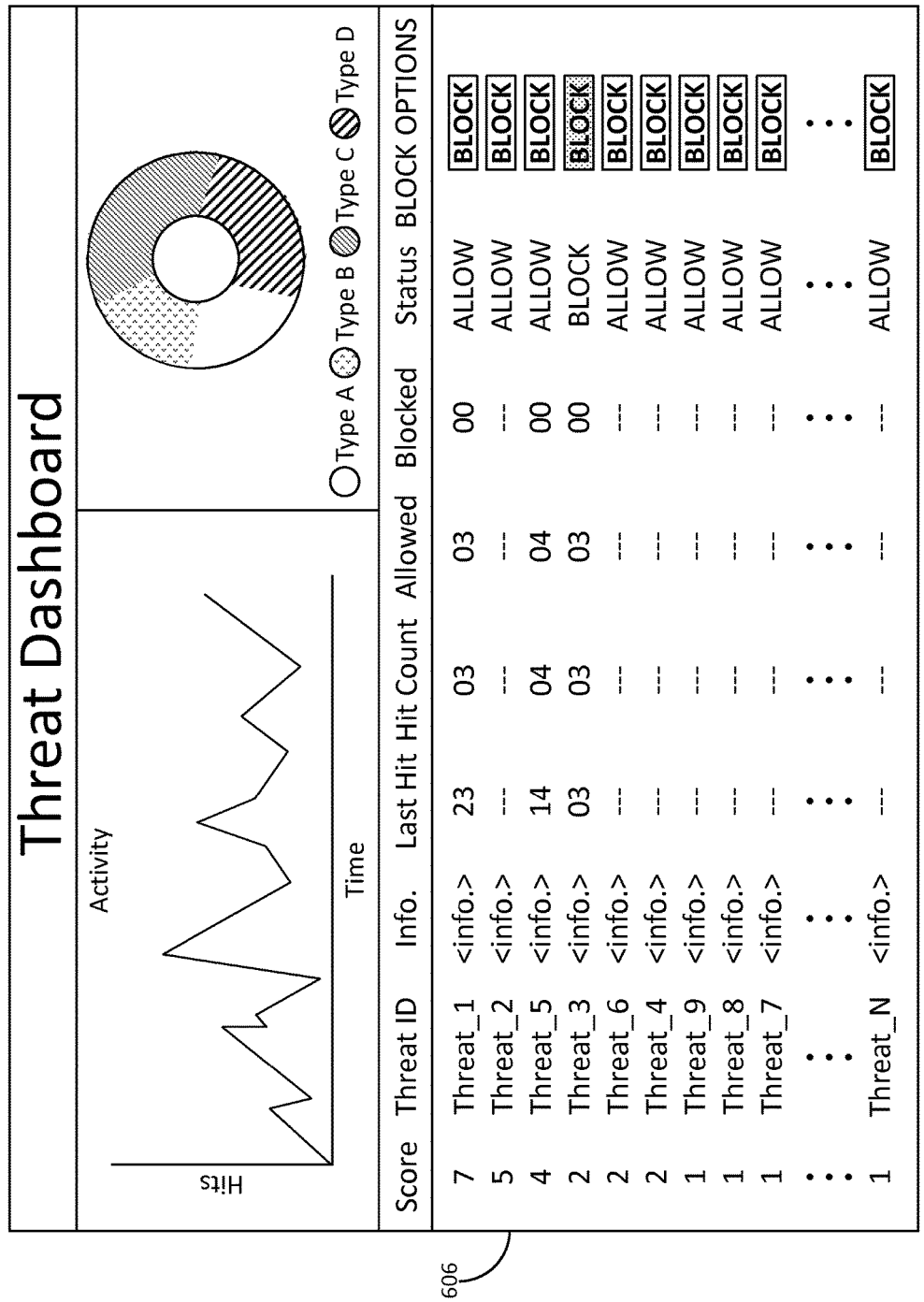

Returning to FIG. 3C, at step 29, packet-filtering device 144 may utilize flow log 504 to generate data comprising an update for interface 600 and may communicate the data to host 110. For example, referring to FIG. 6D, the update may cause interface 600 to update an entry in listing 606 that is associated with the threat associated with Threat ID: Threat_1 to reflect the packets received in step 22, the change in the operator of the packet-filtering rule associated with the threat associated with Thread ID: Threat_3, a new score (e.g., 7) assigned by packet-filtering device 144 to the threat associated with Threat ID: Threat_1 (e.g., the score may have increased based on the packets received in step 22), a new score (e.g., 2) assigned by packet-filtering device 144 to the threat associated with Threat ID: Threat_3 (e.g., the score may have decreased based on the change of the operator in its associated packet-filtering rule), a new score (e.g., 4) assigned by packet-filtering device 144 to the threat associated with Threat ID: Threat_5, and a revised ordering, determined by packet-filtering device 144 based on the new scores.

Figure 3D:
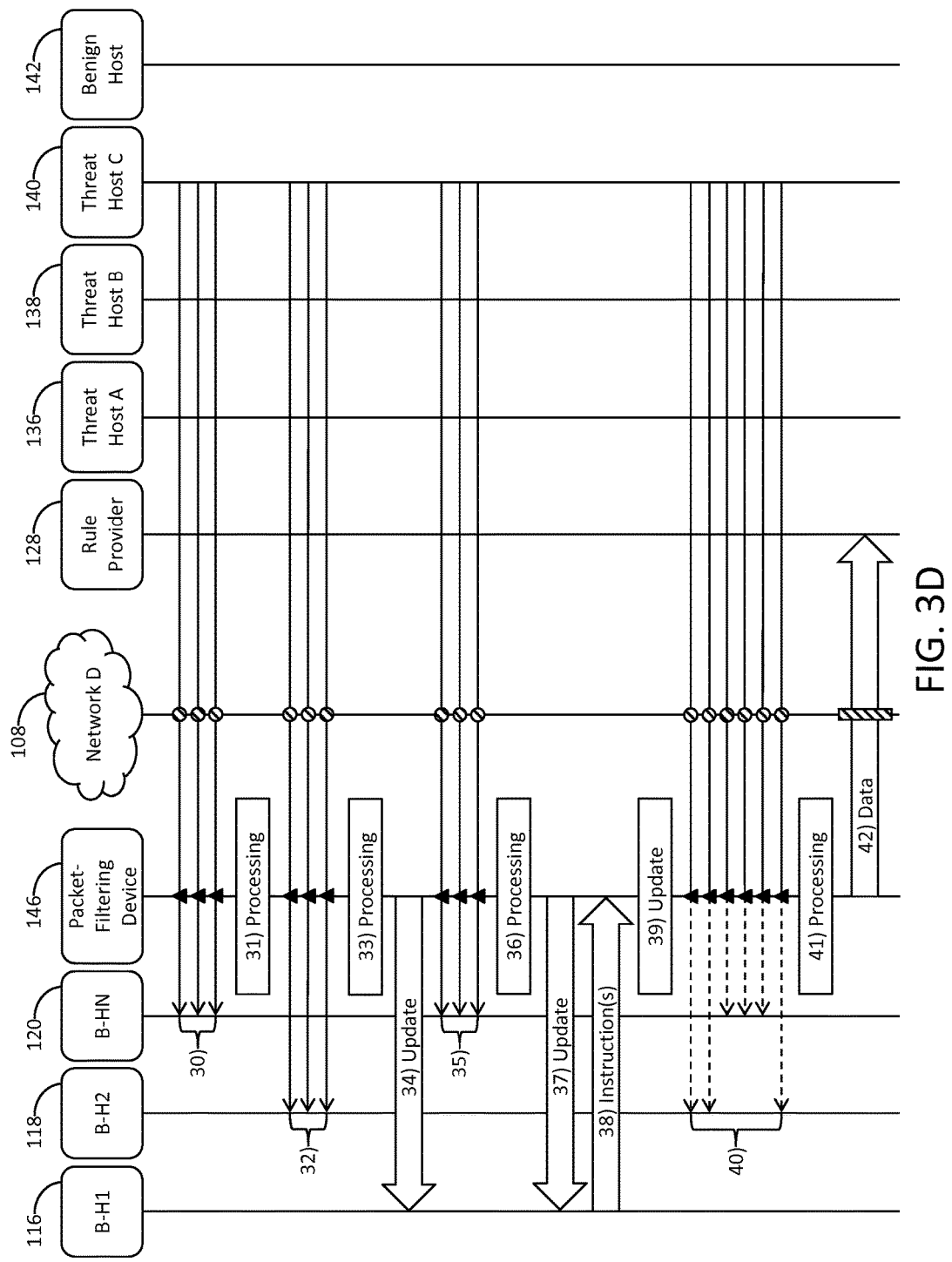

Referring to FIG. 3D, at step 30, three packets destined for host 120 may be communicated by threat host 140, and packet-filtering device 146 may receive each of the three packets, apply one or more of its packet-filtering rules to the three packets, determine that each of the three packets corresponds to criteria specified by a packet-filtering rule (e.g., a rule corresponding to Threat ID: Threat_1), apply an operator specified by the packet-filtering rule (e.g., an ALLOW operator) to each of the three packets, allow each of the three packets to continue toward its respective destination (e.g., toward host 120), and generate log data for each of the three packets. At step 31, packet-filtering device 146 may begin processing the log data generated in step 30.

At step 32, three packets destined for host 118 may be communicated by threat host 140, and packet-filtering device 146 may receive each of the three packets, apply one or more of its packet-filtering rules to the three packets, determine that each of the three packets corresponds to criteria specified by a packet-filtering rule (e.g., the rule corresponding to Threat ID: Threat_1), apply an operator specified by the packet-filtering rule (e.g., an ALLOW operator) to each of the three packets, allow each of the three packets to continue toward its respective destination (e.g., toward host 118), and generate log data for each of the three packets.

At step 33, packet-filtering device 146 may continue processing the log data generated in step 30 and may begin processing the log data generated in step 33. At step 34, packet-filtering device 146 may generate data comprising an update for an interface associated with packet-filtering device 146 and displayed by host 116 (e.g., an interface similar to interface 600) and may communicate the data comprising the update to host 116.

At step 35, three packets destined for host 120 may be communicated by threat host 140, and packet-filtering device 146 may receive each of the three packets, apply one or more of its packet-filtering rules to the three packets, determine that each of the three packets corresponds to criteria specified by a packet-filtering rule (e.g., the rule corresponding to Threat ID: Threat_1), apply an operator specified by the packet-filtering rule (e.g., an ALLOW operator) to each of the three packets, allow each of the three packets to continue toward its respective destination (e.g., toward host 120), and generate log data for each of the three packets. At step 36, packet-filtering device 146 may continue processing the log data generated in step 32 and may begin processing the log data generated in step 35.

At step 37, packet-filtering device 146 may generate data comprising an update for the interface associated with packet-filtering device 146 and displayed by host 116 and may communicate the data comprising the update to host 116. At step 38, host 116 may communicate instructions to packet-filtering device 146 instructing packet-filtering device 146 to reconfigure one or more of its packet-filtering rules (e.g., to reconfigure the operator of the rule corresponding to Threat ID: Threat_1 to BLOCK), and, at step 39, packet-filtering device 146 may reconfigure its packet-filtering rules accordingly.

At step 40, three packets destined for host 118 and three packets destined for host 120 may be communicated by threat host 140, and packet-filtering device 146 may receive each of the six packets, apply one or more of its packet-filtering rules to the six packets, determine that each of the six packets corresponds to criteria specified by a packet-filtering rule (e.g., the rule corresponding to Threat ID: Threat_1), apply an operator specified by the packet-filtering rule (e.g., the BLOCK operator) to each of the six packets, prevent each of the six packets from continuing toward its respective destination, and generate log data for each of the six packets. At step 41, packet-filtering device 146 may continue processing the log data generated in step 35 and may begin processing the log data generated in step 40.

At step 42, packet-filtering device 146 may communicate data to rule provider 128 (e.g., data indicating that fifteen packets corresponding to Threat ID: Threat_1 were received by packet-filtering device 146, packet-filtering device 146 allowed nine of the fifteen packets to continue toward hosts in network 104, and packet-filtering device 146 prevented six of the fifteen packets from continuing toward hosts in network 104).

Figure 3E:
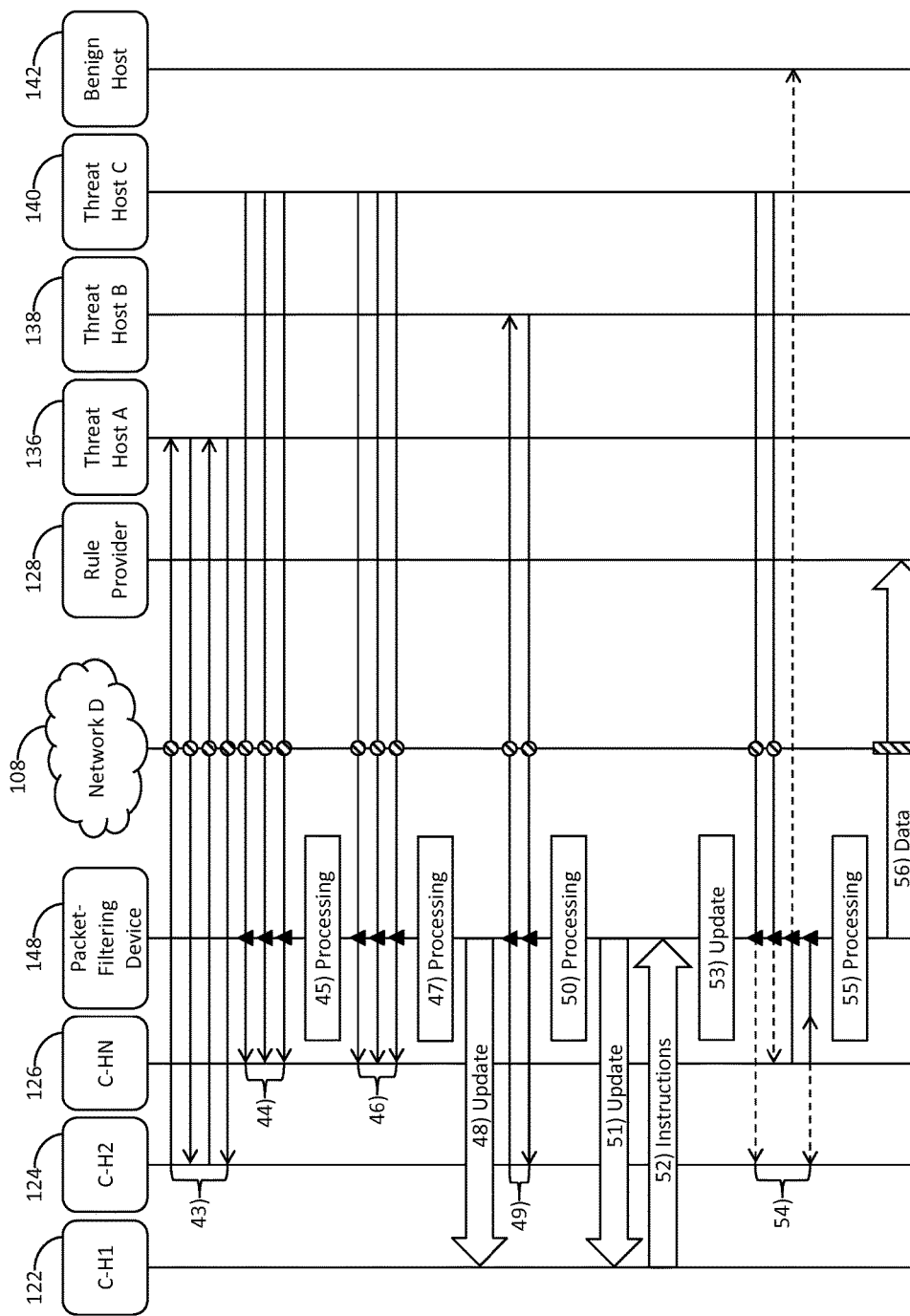

Referring to FIG. 3E, at step 43, four packets may be communicated between host 124 and threat host 136 (e.g., two packets originating from host 124 and destined for threat host 136 and two packets originating from threat host 136 and destined for host 124), and packet-filtering device 148 may receive each of the four packets, apply one or more of its packet-filtering rules to the four packets, and allow the four packets to continue toward their respective destinations.

At step 44, three packets destined for host 126 may be communicated by threat host 140, and packet-filtering device 148 may receive each of the three packets, apply one or more of its packet-filtering rules to the three packets, determine that each of the three packets corresponds to criteria specified by a packet-filtering rule (e.g., a rule corresponding to Threat ID: Threat_1), apply an operator specified by the packet-filtering rule (e.g., an ALLOW operator) to each of the three packets, allow each of the three packets to continue toward its respective destination (e.g., toward host 126), and generate log data for each of the three packets. At step 45, packet-filtering device 148 may begin processing the log data generated in step 44.

At step 46, three packets destined for host 126 may be communicated by threat host 140, and packet-filtering device 148 may receive each of the three packets, apply one or more of its packet-filtering rules to the three packets, determine that each of the three packets corresponds to criteria specified by a packet-filtering rule (e.g., the rule corresponding to Threat ID: Threat_1), apply an operator specified by the packet-filtering rule (e.g., an ALLOW operator) to each of the three packets, allow each of the three packets to continue toward its respective destination (e.g., toward host 126), and generate log data for each of the three packets.

At step 47, packet-filtering device 148 may continue processing the log data generated in step 44 and may begin processing the log data generated in step 47. At step 48, packet-filtering device 148 may generate data comprising an update for an interface associated with packet-filtering device 148 and displayed by host 122 (e.g., an interface similar to interface 600) and may communicate the data comprising the update to host 122.

At step 49, two packets may be communicated between host 124 and threat host 138 (e.g., a packet originating from host 124 and destined for threat host 138 and a packet originating from threat host 138 and destined for host 124), and packet-filtering device 148 may receive each of the two packets, apply one or more of its packet-filtering rules to the two packets, determine that each of the two packets corresponds to criteria specified by a packet-filtering rule (e.g., a rule corresponding to Threat ID: Threat_5), apply an operator specified by the packet-filtering rule (e.g., an ALLOW operator) to each of the two packets, allow each of the two packets to continue toward its respective destination, and generate log data for each of the two packets. At step 50, packet-filtering device 148 may continue processing the log data generated in step 46 and may begin processing the log data generated in step 49.

At step 51, packet-filtering device 148 may generate data comprising an update for the interface associated with packet-filtering device 148 and displayed by host 122 and may communicate the data comprising the update to host 122. At step 52, host 122 may communicate instructions to packet-filtering device 148 instructing packet-filtering device 148 to reconfigure one or more of its packet-filtering rules to block all packets corresponding to the network-threat indicators associated with Threat ID: Threat_1 (e.g., to reconfigure the operator of the rule corresponding to Threat ID: Threat_1 to BLOCK), and to implement one or more new packet-filtering rules configured to block all packets originating from host 126, and, at step 53, packet-filtering device 148 may reconfigure its packet-filtering rules accordingly.

At step 54, threat host 140 may generate a packet destined for host 124 and a packet destined for host 126, host 126 may generate a packet destined for benign host 142 and a packet destined for host 124, and packet-filtering device 148 may receive each of the four packets, apply one or more of its packet-filtering rules to the four packets, determine that the packets generated by threat host 140 correspond to criteria specified by the packet-filtering rule corresponding to Threat ID: Threat_1, apply an operator specified by the packet-filtering rule corresponding to Threat ID: Threat_1 (e.g., the BLOCK operator) to each of the two packets generated by threat host 140, determine that the packets generated by host 126 correspond to criteria specified by the new packet-filtering rules (e.g., a network address associated with host 126), apply an operator specified by the new packet-filtering rules (e.g., the BLOCK operator) to each of the two packets generated by host 126, prevent each of the four packets from continuing toward its respective destination, and generate log data for each of the four packets.

At step 55, packet-filtering device 148 may continue processing the log data generated in step 49 and may begin processing the log data generated in step 54. At step 56, packet-filtering device 148 may communicate data to rule provider 128 (e.g., data indicating that eight packets corresponding to Threat ID: Threat_1 were received by packet-filtering device 148, packet-filtering device 148 allowed six of the eight packets to continue toward hosts in network 106, packet-filtering device 148 prevented two of the eight packets from continuing toward hosts in network 106, two packets corresponding to Threat ID: Threat_5 were received by packet-filtering device 148, and packet-filtering device 148 allowed both of the two packets to continue toward their respective destinations).

Figure 3F:
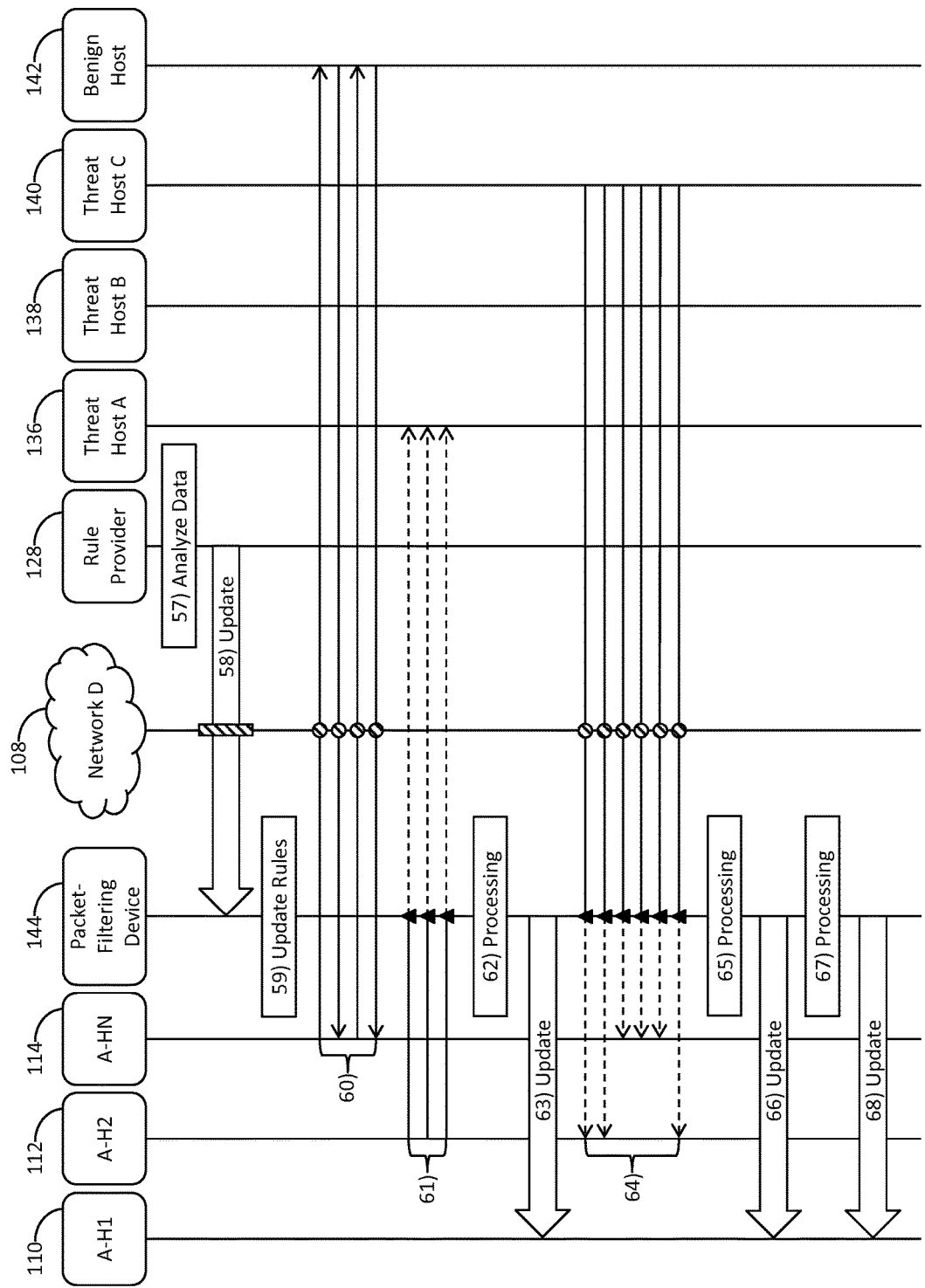

Referring to FIG. 3F, at step 57, rule provider 128 (e.g., computing devices 222) may analyze the data received from packet-filtering devices 146 and 148 (e.g., in steps 42 and 56, respectively) and may generate, based on the analysis, an update for packet-filtering device 148. In some embodiments, the update may be configured to cause packet-filtering device 144 to reconfigure an operator of a packet-filtering rule included in packet-filtering rules 404 (e.g., to reconfigure packet-filtering device 144 to prevent packets corresponding to the criteria specified by the rule from continuing toward their respective destinations). Additionally or alternatively, the update may reconfigure one or more of packet-filtering rules 404 to affect the ordering (e.g., the scoring) of the network threats associated with packet-filtering rules 404. At step 58, rule provider 128 may communicate the updates to packet-filtering device 144, which may receive the updates and, at step 59, may update packet-filtering rules 404 accordingly. For example, the update may be configured to cause packet-filtering device 144 to reconfigure the operator of Rule: TI001 to the BLOCK operator (e.g., to reconfigure packet-filtering device 144 to prevent packets corresponding to the network-threat indicators associated with the network threat corresponding to Threat ID: Threat_1 from continuing toward their respective destinations, and packet-filtering device 144 may reconfigure packet-filtering rules 404 accordingly, as reflected in FIG. 4C).

At step 60, four packets may be communicated between host 114 and benign host 142 (e.g., two packets originating from host 114 and destined for benign host 142 and two packets originating from benign host 142 and destined for host 114), and packet-filtering device 144 may receive each of the four packets, apply one or more of packet-filtering rules 218 to the four packets, and allow the four packets to continue toward their respective destinations.

At step 61, three packets destined for threat host 136 may be communicated by host 112, and packet-filtering device 144 may receive each of the three packets, apply one or more of packet-filtering rules 218 to the three packets, determine that each of the three packets corresponds to criteria specified by a packet-filtering rule of packet-filtering rules 404 (e.g., Rule: TI003), apply an operator specified by the packet-filtering rule (e.g., the BLOCK operator) to each of the three packets, prevent each of the three packets from continuing toward its respective destination (e.g., toward threat host 136), and generate log data for each of the three packets.

At step 62, packet-filtering device 144 may continue processing the log data generated in step 27 and may begin processing the log data generated in step 62. For example, referring to FIG. 5E, packet-filtering device 144 may generate entries in packet log 502 for each of the packets received in step 61 while modifying an entry in flow log 504 for the packets received in step 27 based on the entries generated in packet log 502 (e.g., in step 28) for the packets received in step 27, for example, modifying the entry corresponding to Threat ID: Threat_3 (e.g., the time range and the count of associated packets prevented by packet-filtering device 144 from continuing toward their respective destinations).

Figure 6E:
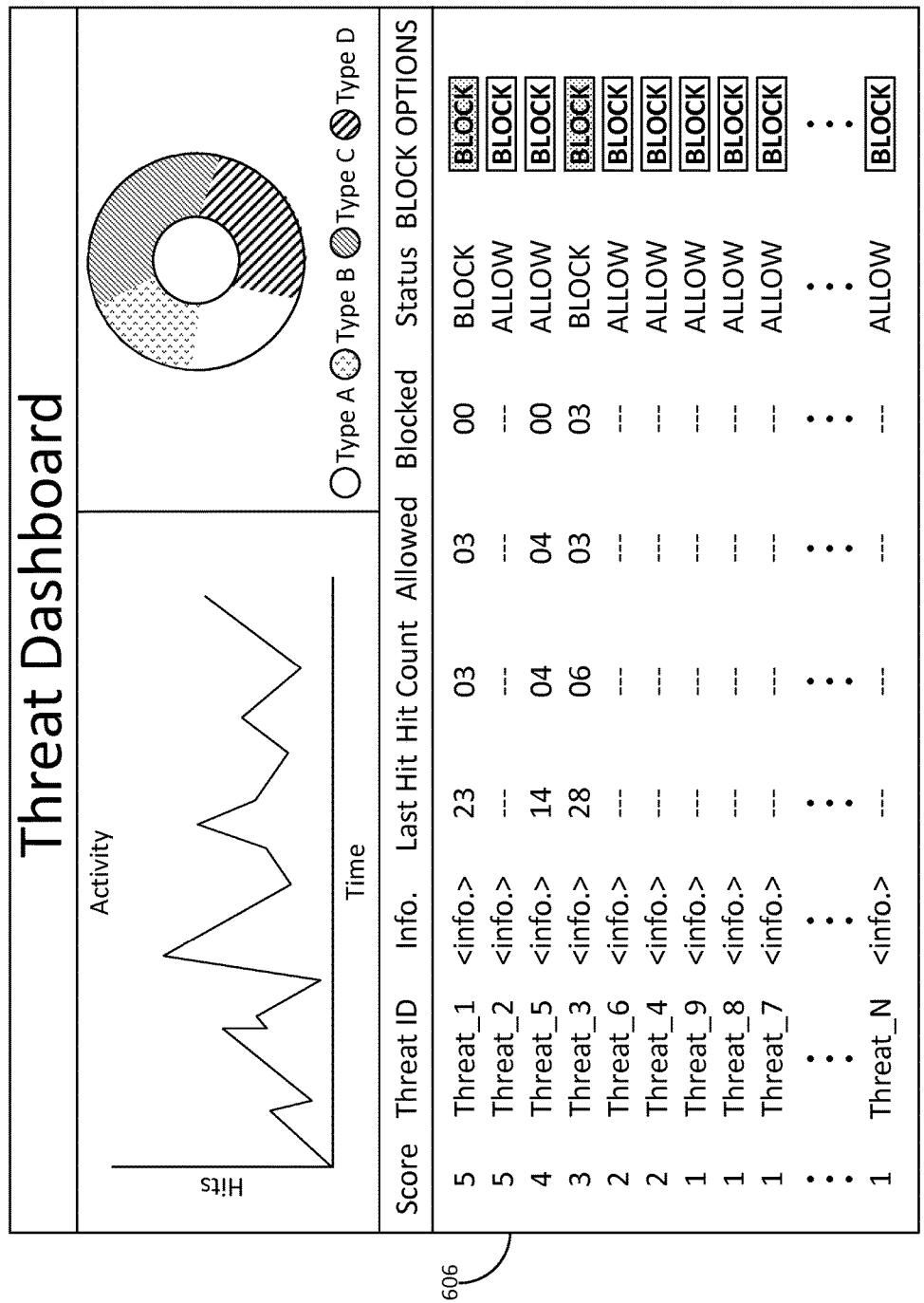

At step 63, packet-filtering device 144 may utilize flow log 504 to generate data comprising an update for interface 600 and may communicate the data to host 110. For example, referring to FIG. 6E, the update may cause interface 600 to update the entry in listing 606 associated with Threat ID: Threat_3 to reflect the packets received in step 27, the change in the operator of the packet-filtering rule associated with Thread ID: Threat_1, a new score (e.g., 3) assigned by packet-filtering device 144 to the threat associated with Threat ID: Threat_3 (e.g., the score may have increased based on the packets received in step 27), and a new score (e.g., 5) assigned by packet-filtering device 144 to the threat associated with Threat ID: Threat_1 (e.g., the score may have decreased based on the change of the operator in its associated packet-filtering rule).

At step 64, three packets destined for host 112 and three packets destined for host 114 may be communicated by threat host 140, and packet-filtering device 144 may receive each of the six packets, apply one or more of packet-filtering rules 218 to the three packets, determine that each of the three packets corresponds to criteria specified by a packet-filtering rule of packet-filtering rules 404 (e.g., Rule: TI001), apply an operator specified by the packet-filtering rule (e.g., the BLOCK operator) to each of the six packets, prevent each of the six packets from continuing toward its respective destination, and generate log data for each of the six packets.

At step 65, packet-filtering device 144 may continue processing the log data generated in step 61 and may begin processing the log data generated in step 64. For example, referring to FIG. 5F, packet-filtering device 144 may generate entries in packet log 502 for each of the packets received in step 64 while modifying an entry in flow log 504 for the packets received in step 61 based on the entries generated in packet log 502 (e.g., in step 62) for the packets received in step 61, for example, modifying the entry corresponding to Threat ID: Threat_3 (e.g., the time range and the count of associated packets prevented by packet-filtering device 144 from continuing toward their respective destinations).

Figure 6F:
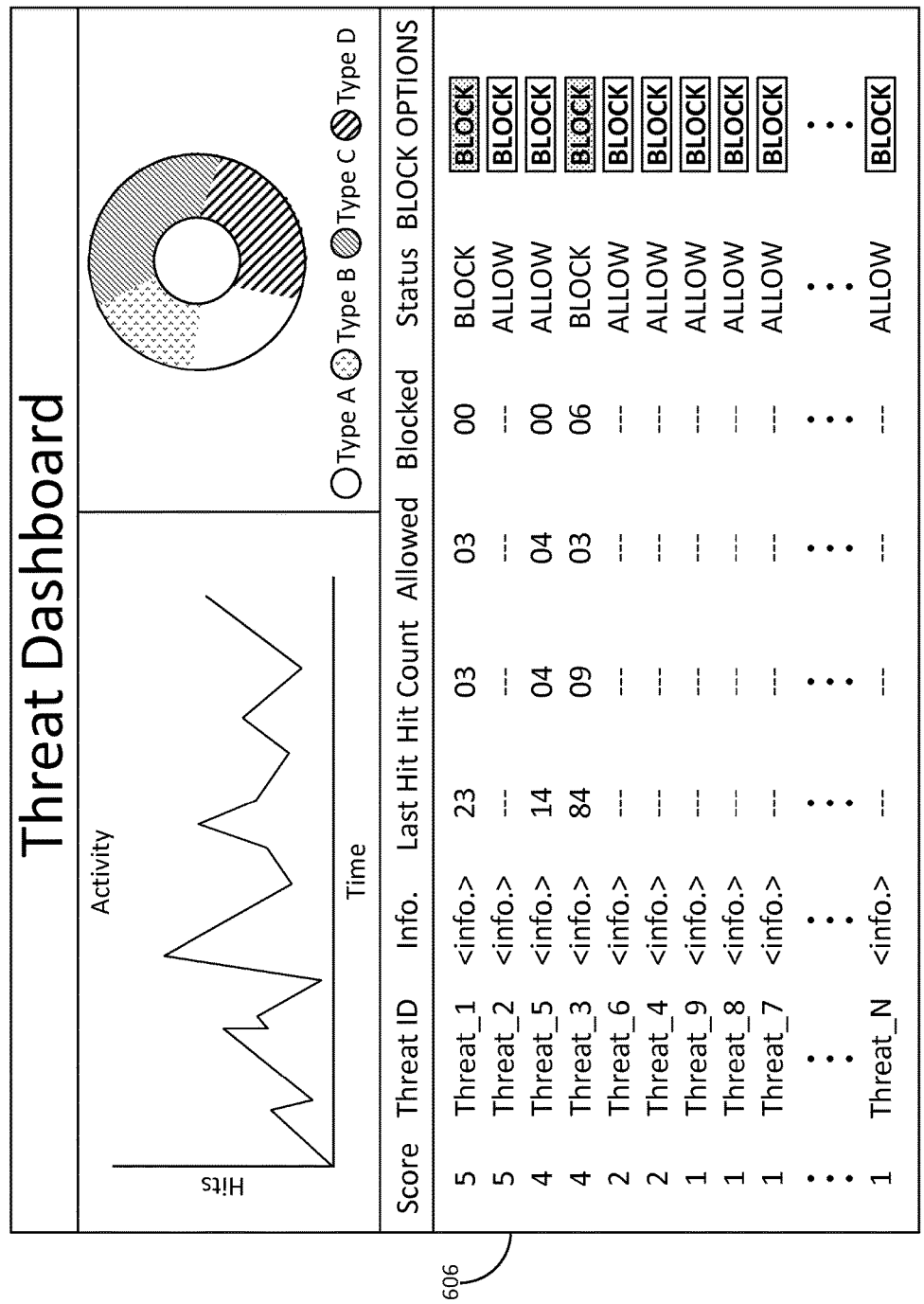

At step 66, packet-filtering device 144 may utilize flow log 504 to generate data comprising an update for interface 600 and may communicate the data to host 110. For example, referring to FIG. 6F, the update may cause interface 600 to update the entry in listing 606 associated with Threat ID: Threat_3 to reflect the packets received in step 61 and a new score (e.g., 3) assigned by packet-filtering device 144 to the threat associated with Threat ID: Threat_3 (e.g., the score may have increased based on the packets received in step 61).

At step 67, packet-filtering device 144 may continue processing the log data generated in step 64. For example, referring to FIG. 5G, packet-filtering device 144 may modify an entry in flow log 504 for the packets received in step 64 based on the entries generated in packet log 502 (e.g., in step 65) for the packets received in step 64, for example, modifying the entry corresponding to Threat ID: Threat_1 (e.g., the time range and the count of associated packets prevented by packet-filtering device 144 from continuing toward their respective destinations).

Figure 6G:
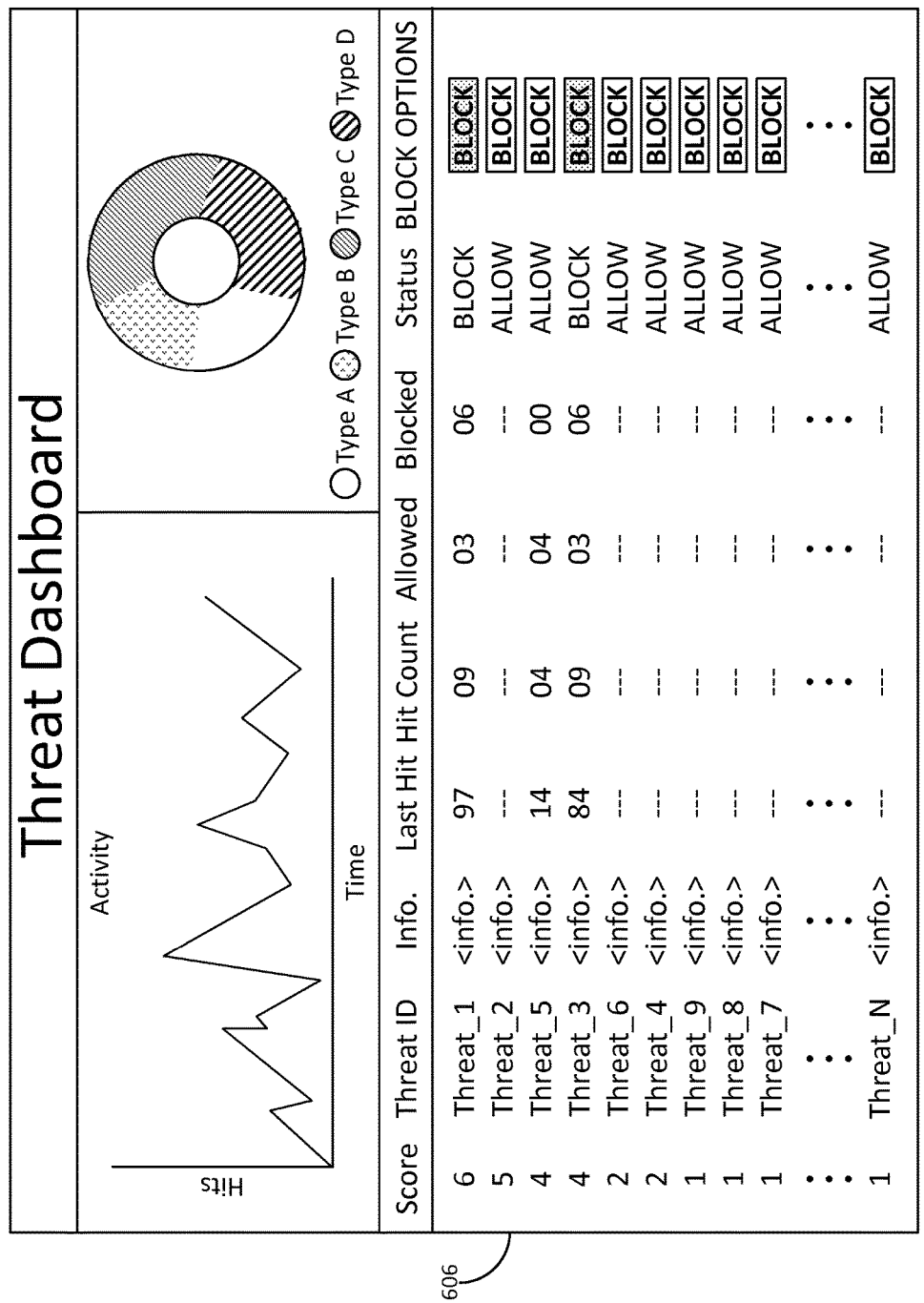

At step 68, packet-filtering device 144 may utilize flow log 504 to generate data comprising an update for interface 600 and may communicate the data to host 110. For example, referring to FIG. 6G, the update may cause interface 600 to update the entry in listing 606 associated with Threat ID: Threat_1 to reflect the packets received in step 64 and a new score (e.g., 6) assigned by packet-filtering device 144 to the threat associated with Threat ID: Threat_1 (e.g., the score may have increased based on the packets received in step 64).

Figure 7:
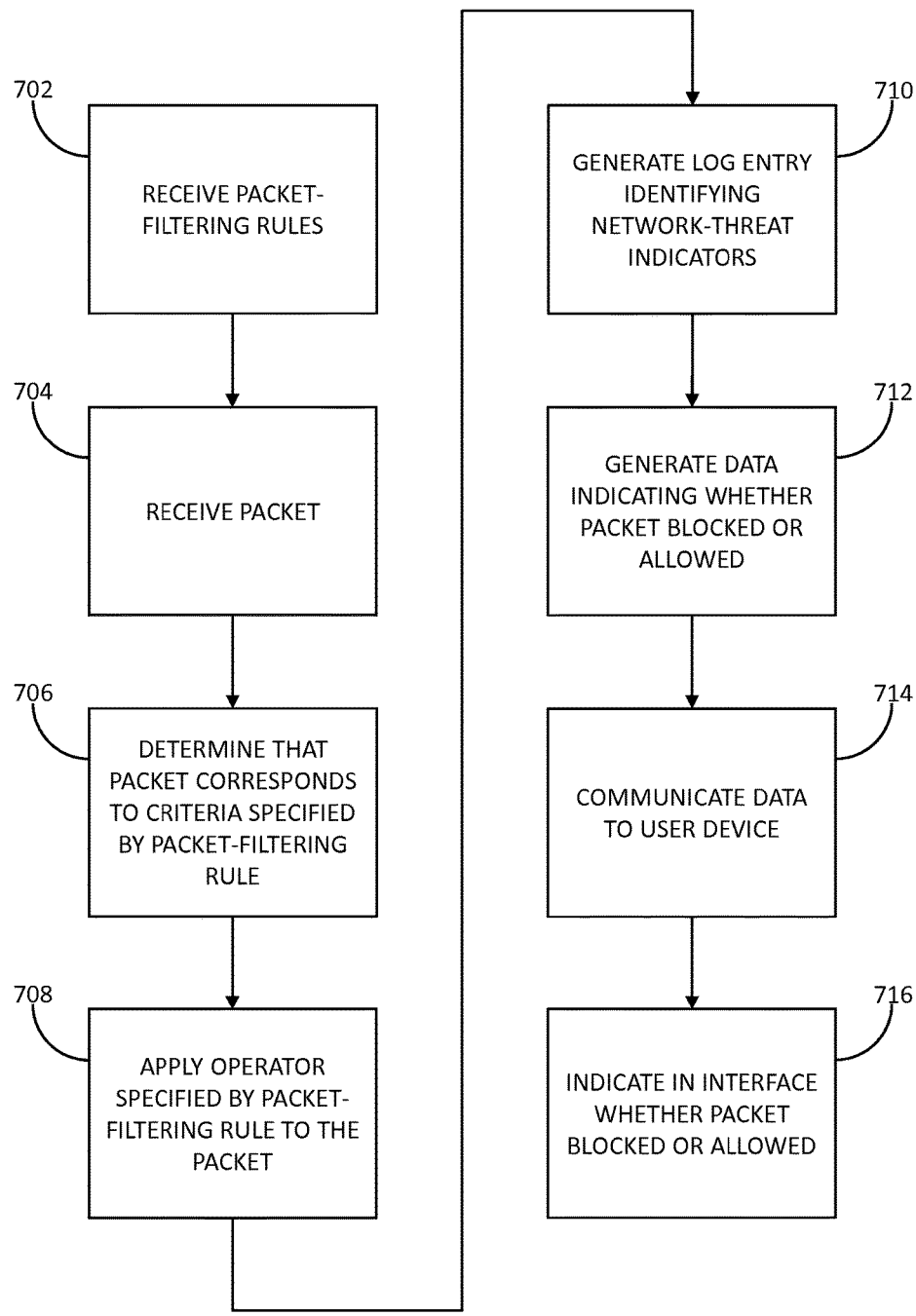
FIG. 7 depicts an illustrative method for rule-based network-threat detection in accordance with one or more aspects of the disclosure.

FIG. 7 depicts an illustrative method for rule-based network-threat detection in accordance with one or more aspects of the disclosure. Referring to FIG. 7, at step 702, a packet-filtering device may receive a plurality of packet-filtering rules configured to cause the packet-filtering device to identify packets corresponding to one or more network-threat indicators. For example, packet-filtering device 144 may receive packet-filtering rules 404 from rule provider 128. At step 704, the packet-filtering device may receive a packet corresponding to at least one of the network-threat indicators. For example, packet-filtering device 144 may receive a packet generated by host 112 and destined for threat host 136. At step 706, the packet-filtering device may determine that the packet corresponds to criteria specified by one of the plurality of packet-filtering rules. For example, packet-filtering device 144 may determine that the packet generated by host 112 and destined for threat host 136 corresponds to Rule: TI003. At step 708, the packet-filtering device may apply an operator specified by the packet-filtering rule to the packet. For example, packet-filtering device 144 may apply an operator (e.g., an ALLOW operator) specified by Rule: TI003 to the packet generated by host 112 and may allow the packet generated by host 112 to continue toward threat host 136.

At step 710, the packet-filtering device may generate a log entry comprising information from the packet-filtering rule that is distinct from the criteria and identifies the one or more network-threat indicators. For example, packet-filtering device 144 may generate an entry in packet log 502 comprising Threat ID: Threat_3 for the packet generated by host 112. At step 712, the packet-filtering device may generate data indicating whether the packet-filtering device prevented the packet from continuing toward its destination (e.g., blocked the packet) or allowed the packet to continue toward its destination. For example, packet-filtering device 144 may generate data comprising an update for interface 600 that indicates that packet-filtering device 144 allowed the packet generated by host 112 to continue toward threat host 136. At step 714, the packet-filtering device may communicate the data to a user device. For example, packet-filtering device 144 may communicate the data comprising the update for interface 600 to host 110. At step 716, the packet-filtering device may indicate in an interface whether the packet-filtering device prevented the packet from continuing toward its destination or allowed the packet to continue toward its destination. For example, communicating the data comprising the update for interface 600 may cause host 110 to indicate in interface 600 that packet-filtering device 144 allowed the packet generated by host 112 to continue toward threat host 136.

The functions and steps described herein may be embodied in computer-usable data or computer-executable instructions, such as in one or more program modules, executed by one or more computers or other devices to perform one or more functions described herein. Generally, program modules include routines, programs, objects, components, data structures, etc. that perform particular tasks or implement particular abstract data types when executed by one or more processors in a computer or other data-processing device. The computer-executable instructions may be stored on a computer-readable medium such as a hard disk, optical disk, removable storage media, solid-state memory, RAM, etc. As will be appreciated, the functionality of the program modules may be combined or distributed as desired. In addition, the functionality may be embodied in whole or in part in firmware or hardware equivalents, such as integrated circuits, application-specific integrated circuits (ASICs), field-programmable gate arrays (FPGA), and the like. Particular data structures may be used to more effectively implement one or more aspects of the disclosure, and such data structures are contemplated to be within the scope of computer-executable instructions and computer-usable data described herein.

Although not required, one of ordinary skill in the art will appreciate that various aspects described herein may be embodied as a method, system, apparatus, or one or more computer-readable media storing computer-executable instructions. Accordingly, aspects may take the form of an entirely hardware embodiment, an entirely software embodiment, an entirely firmware embodiment, or an embodiment combining software, hardware, and firmware aspects in any combination.

As described herein, the various methods and acts may be operative across one or more computing devices and networks. The functionality may be distributed in any manner or may be located in a single computing device (e.g., a server, client computer, or the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order and that one or more illustrated steps may be optional. Any and all features in the following claims may be combined or rearranged in any way possible.

What is claimed is:

1. A method comprising:
   receiving, by a packet-filtering device, a plurality of packets;
   responsive to a determination by the packet-filtering device that a first packet of the plurality of packets corresponds to one or more packet-filtering rules:
      applying, by the packet-filtering device and to the first packet, an operator specified by a corresponding packet-filtering rule and configured to cause the packet-filtering device to either prevent the first packet from continuing toward a destination of the first packet or allow the first packet to continue toward the destination of the first packet; and
      generating, by the packet-filtering device, a packet log entry comprising at least one threat identifier corresponding to the first packet and data indicating whether the packet-filtering device prevented the first packet from continuing toward the destination of the first packet or allowed the packet to continue toward the destination of the first packet;
   updating, by the packet-filtering device and based on the packet log entry, a packet flow entry, corresponding to the generated packet log entry, of packet flow analysis data for a plurality of logged packets, wherein the packet flow analysis data comprises data corresponding to a plurality of packet flow entries, and wherein each packet flow entry consolidates a plurality of packet log entries corresponding to a common threat identifier;
   communicating, by the packet-filtering device and to a computing device, the packet flow analysis data; and
   causing, based on the communicated packet flow analysis data, display of at least a portion of the packet flow analysis data,
   wherein the packet flow analysis data comprises at least one threat identifier corresponding to each of the plurality of logged packets, packet time data for packets corresponding to the packet flow entry, and data indicating whether the packet-filtering device prevented packets from continuing toward a respective destination or allowed packets to continue toward the respective destination.

2. The method of claim 1, wherein each packet log entry further comprises packet time data, data derived from an associated packet, environmental data of the associated packet, data identifying a corresponding packet-filtering rule, data indicating an operator applied, and at least one corresponding threat identifier.

3. The method of claim 1, wherein the packet flow analysis data comprises a time range of the plurality of packet log entries corresponding to the common threat identifier, and wherein the time range indicates an earliest hit time and a latest time hit.

4. The method of claim 1, wherein the updating the packet flow entry of the packet flow analysis data for the plurality of logged packets further comprises:
   modifying, for each packet of the plurality of packets, responsive to a determination that each packet corresponds to one or more packet-filtering rules, and based on the packet log entry, an existing packet flow log entry to indicate one or more corresponding packet-filtering rules and whether the packet-filtering device prevented each packet from continuing toward each packet's respective destination or allowed each packet to continue toward each packet's respective destination.

5. The method of claim 1, wherein:
   each packet flow entry of the plurality of packet flow entries corresponds to a different threat identifier of a plurality of threat identifiers; and
   updating the packet flow entry of the packet flow analysis data comprises updating a packet flow entry, of the plurality of packet flow entries and based on the packet log entry, of a threat identifier that corresponds to the packet log entry.

6. The method of claim 1, wherein the packet flow analysis data further comprises one or more scores, wherein each score is associated with a corresponding packet flow entry, the method further comprising:
   determining the one or more scores based on a number of packets associated with each packet flow entry and based on times associated with the packets associated with each packet flow entry;
   updating the one or more scores based on each packet log entry; and
   indicating, in the packet flow analysis data, the one or more scores.

7. The method of claim 6, the method further comprising:
   updating the one or more scores based on one or more times at which one or more packets of the plurality of logged packets that corresponds to one or more packet-filtering rules were filtered by the packet-filtering device; and
   updating the one or more scores based on a number of the plurality of logged packets that correspond to the one or more packet-filtering rules.

8. The method of claim 6, wherein determining the one or more scores further comprises determining the one or more scores based on an identity of one or more network-threat-intelligence providers that provided network-threat indicators associated with a corresponding threat identifier, and a number of network-threat intelligence providers that provided network-threat indicators associated with a corresponding threat identifier.

9. The method of claim 6, wherein determining the one or more scores further comprises determining the one or more scores based on a destination of a packet of the plurality of logged packets that corresponds to the one or more packet-filtering rules.

10. The method of claim 6, wherein determining the one or more scores further comprises determining the one or more scores based on at least one of a type of threat associated with a packet flow entry threat indicator, geographic information, an anonymous proxy associated with the packet flow entry threat indicator, or an actor associated with the packet flow entry threat indicator.

11. A packet-filtering device comprising:
at least one processor; and
memory storing instructions that when executed by the at least one processor cause the packet-filtering device to:
receive a plurality of packets;
responsive to a determination by the packet-filtering device that a first packet of the plurality of packets corresponds to one or more packet-filtering rules:
apply, to the first packet, an operator specified by a corresponding packet-filtering rule and configured to cause the packet-filtering device to either prevent the first packet from continuing toward a destination of the first packet or allow the first packet to continue toward the destination of the first packet; and
generate a packet log entry comprising at least one threat indicator corresponding to the first packet and data indicating whether the packet-filtering device prevented the first packet from continuing toward the destination of the first packet or allowed the packet to continue toward the destination of the first packet;
update, based on the packet log entry, a packet flow entry, corresponding to the generated packet log entry, of packet flow analysis data for a plurality of logged packets, wherein the packet flow analysis data comprises data corresponding to a plurality of packet flow entries, and wherein each packet flow entry consolidates a plurality of packet log entries corresponding to a common threat identifier;
communicate, to a computing device, the packet flow analysis data; and
cause, based on the communicated packet flow analysis data, display of at least a portion of the packet flow analysis data,
wherein the packet flow analysis data comprises at least one threat identifier corresponding to each of the plurality of logged packets, packet time data for packets corresponding to the packet flow entry, and data indicating whether the packet-filtering device prevented packets from continuing toward a respective destination or allowed packets to continue toward the respective destination.

12. The packet-filtering device of claim 11, wherein each packet log entry further comprises packet time data, data derived from an associated packet, environmental data of the associated packet, data identifying a corresponding packet-filtering rule, data indicating an operator applied, and at least one corresponding threat identifier.

13. The packet-filtering device of claim 11, wherein the packet flow analysis data comprises a time range of the plurality of packet log entries corresponding to the common threat identifier, and wherein time range indicates an earliest hit time and a latest time hit.

14. The packet-filtering device of claim 11, wherein the instructions that when executed by the at least one processor further cause the packet-filtering device to update the packet flow entry of the packet flow analysis data for the plurality of logged packets further comprising instructions that when executed by the at least one processor further cause the packet-filtering device to modify, for each packet of the plurality of logged packets, responsive to a determination that each packet corresponds to the one or more packet-filtering rules, and based on the packet log entry, an existing packet flow log entry to indicate the one or more corresponding packet-filtering rules and whether the packet-filtering device prevented each packet from continuing toward each packet's respective destination or allowed each packet to continue toward each packet's respective destination.

15. The packet-filtering device of claim 11, wherein:
each packet flow entry of the plurality of packet flow entries corresponds to a different threat identifier of a plurality of threat identifiers; and
the update of the packet flow entry of the packet flow analysis data further comprises updating a packet flow entry, of the plurality of packet flow entries and based on the packet log entry, of a threat identifier that corresponds to the packet log entry.

16. The packet-filtering device of claim 11, wherein the packet flow analysis data further comprises one or more scores, wherein each score is associated with a corresponding packet flow entry, the memory storing instructions that when executed by the at least one processor further cause the packet-filtering device to:
determine the one or more scores based on a number of packets associated with each packet flow entry and based on times associated with the packets associated with each packet flow entry;
update the one or more scores based on each packet log entry; and
indicate, in the packet flow analysis data, the one or more scores.

17. The packet-filtering device of claim 16, wherein the instructions that when executed by the at least one processor further cause the packet-filtering device to:
update the one or more scores based on one or more times at which one or more packets of the plurality of logged packets that correspond to the one or more packet-filtering rules were filtered by the packet-filtering device; and
update the one or more scores based on a number of the plurality of logged packets that correspond to the one or more packet-filtering rules.

18. The packet-filtering device of claim 16, wherein the instructions that when executed by the at least one processor further cause the packet-filtering device to determine the one or more scores further comprise instructions that when executed by the at least one processor further cause the packet-filtering device to determine the one or more scores based on an identity of one or more network-threat-intelligence providers that provided network-threat indicators associated with a corresponding threat identifier, and a number of network-threat intelligence providers that provided network-threat indicators associated with a corresponding threat identifier.

19. The packet-filtering device of claim 16, wherein the instructions that when executed by the at least one processor further cause the packet-filtering device to determine the one or more scores further comprise instructions that when executed by the at least one processor further cause the packet-filtering device to determine the one or more scores based on a destination of a packet of the plurality of logged packets that corresponds to the one or more packet-filtering rules.

20. One or more non-transitory computer-readable media comprising instructions that when executed by at least one processor of a packet-filtering device cause the packet-filtering device to:
receive a plurality of packets;
responsive to a determination by the packet-filtering device that a first packet of the plurality of packets corresponds to one or more packet-filtering rules:
apply, to the first packet, an operator specified by a corresponding packet-filtering rule and configured to cause the packet-filtering device to either prevent the first packet from continuing toward a destination of the first packet or allow the first packet to continue toward the destination of the first packet; and
generate a packet log entry comprising at least one threat indicator corresponding to the first packet and data indicating whether the packet-filtering device prevented the first packet from continuing toward the destination of the first packet or allowed the packet to continue toward the destination of the first packet;
update, based on the packet log entry, a packet flow entry, corresponding to the generated packet log entry, of packet flow analysis data for a plurality of logged packets, wherein the packet flow analysis data comprises data corresponding to a plurality of packet flow entries, and wherein each packet flow entry consolidates a plurality of packet log entries corresponding to a common threat identifier;
communicate, to a computing device, the packet flow analysis data; and
cause, based on the communicated packet flow analysis data, display of at least a portion of the packet flow analysis data,
wherein the packet flow analysis data comprises at least one threat identifier corresponding to each of the plurality of logged packets, packet time data for packets corresponding to the packet flow entry, and data indicating whether the packet-filtering device prevented packets from continuing toward a respective destination or allowed packets to continue toward the respective destination.

* * * * *